US011845100B2

(12) United States Patent
Liu et al.

(10) Patent No.: US 11,845,100 B2
(45) Date of Patent: Dec. 19, 2023

(54) ELECTROSPRAY DEVICE FOR FLUIDIZED BED APPARATUS, FLUIDIZED BED APPARATUS AND METHOD

(71) Applicant: TIANJIN CENAX BIOTECHNOLOGY CO., LTD., Tianjin (CN)

(72) Inventors: Yiming Liu, Tianjin (CN); Huifen Lu, Shijiazhuang (CN); Fei Liu, Tianjin (CN); Yitao Liu, Suzhou (CN); Min Chen, Tianjin (CN)

(73) Assignee: Tianjin Cenax Biotechnology Co., Ltd., Tianjin (CN)

( * ) Notice: Subject to any disclaimer, the term of this patent is extended or adjusted under 35 U.S.C. 154(b) by 569 days.

(21) Appl. No.: 16/756,453

(22) PCT Filed: Oct. 16, 2017

(86) PCT No.: PCT/CN2017/106330
§ 371 (c)(1),
(2) Date: Apr. 15, 2020

(87) PCT Pub. No.: WO2019/075603
PCT Pub. Date: Apr. 25, 2019

(65) Prior Publication Data
US 2020/0261930 A1    Aug. 20, 2020

(51) Int. Cl.
*B01J 8/24* (2006.01)
*B05B 5/053* (2006.01)
(Continued)

(52) U.S. Cl.
CPC ............... *B05B 5/032* (2013.01); *B01D 1/18* (2013.01); *B01D 1/20* (2013.01); *B01J 2/04* (2013.01);
(Continued)

(58) Field of Classification Search
CPC .... B01D 1/16; B01D 1/18; B01D 1/20; B05B 5/032
See application file for complete search history.

(56) References Cited

U.S. PATENT DOCUMENTS 6,082,628 A * 7/2000 Hutchins ................. B05B 5/032
239/3
7,553,377 B1   6/2009 Chen et al.
(Continued)

FOREIGN PATENT DOCUMENTS

CN    101015782 A   8/2007
CN    101262956 A   9/2008
(Continued)

OTHER PUBLICATIONS

China National Intellectual Property Administration, Office Action, CN Patent Application No. 201780011664.X, dated Feb. 22, 2021, 32 pages.
(Continued)

*Primary Examiner* — Binu Thomas
(74) *Attorney, Agent, or Firm* — Fenwick & West LLP

(57) ABSTRACT

The electrospray device comprises a sprayer comprising a sprayer body and nozzle, and a partition positioned vertically and coaxially with the sprayer. The sprayer body is provided with a swirl generator for generating a swirling air stream, and a power supply connected between the nozzle and the partition, to apply voltage to the nozzle and the partition. The electrospray device may be part of a fluidized bed apparatus comprising a product container, a lower plenum base, an air distribution plate resided therebetween. When the power supply applies voltage in opposite polarities to the nozzle and the partition, the fluidized bed apparatus is used for coating particles; and when the power supply applies voltage of the same, the fluidized bed apparatus is used for spray-drying a solution. The electrospray
(Continued)

device uses an electromagnetic hydrodynamic method to improve the performance of the fluidized bed apparatus and optimize the process of product.

29 Claims, 12 Drawing Sheets

(51) Int. Cl.

| | | |
|---|---|---|
| B01J 2/16 | (2006.01) | |
| B05B 5/03 | (2006.01) | |
| B01D 1/18 | (2006.01) | |
| B01D 1/20 | (2006.01) | |
| B01J 2/04 | (2006.01) | |
| B05B 7/10 | (2006.01) | |
| B01J 8/42 | (2006.01) | |
| B01J 8/18 | (2006.01) | |
| B01D 1/30 | (2006.01) | |

(52) U.S. Cl.
CPC ............ *B01J 2/16* (2013.01); *B01J 8/1818* (2013.01); *B01J 8/24* (2013.01); *B01J 8/42* (2013.01); *B05B 5/053* (2013.01); *B05B 5/0533* (2013.01); *B05B 7/10* (2013.01); *B01D 1/30* (2013.01); *B01J 2219/0036* (2013.01); *B01J 2219/00371* (2013.01)

(56) References Cited

U.S. PATENT DOCUMENTS

| | | | |
|---|---|---|---|
| 2003/0200919 A1 | 10/2003 | Jones et al. | |
| 2006/0139406 A1 | 6/2006 | Tsuchiya et al. | |
| 2006/0251826 A1 | 11/2006 | Pfeifer et al. | |
| 2009/0056133 A1* | 3/2009 | Waits | B05B 5/0255 |
| | | | 29/890.143 |
| 2009/0189952 A1* | 7/2009 | Lee | B41J 2/06 |
| | | | 347/45 |
| 2011/0315079 A1* | 12/2011 | Perpar | B01J 2/006 |
| | | | 118/716 |
| 2015/0258565 A1* | 9/2015 | Filicicchia | B05B 17/0646 |
| | | | 118/303 |
| 2015/0349501 A1* | 12/2015 | Borra | B05B 5/0535 |
| | | | 361/231 |

FOREIGN PATENT DOCUMENTS

| | | | | |
|---|---|---|---|---|
| CN | 104785164 | A | 7/2015 | |
| CN | 105665170 | A | 6/2016 | |
| CN | 106536034 | A | 3/2017 | |
| CN | 208082426 | U | 11/2018 | |
| JP | 59105862 | A | 6/1984 | |
| JP | 2001-062277 | A | 3/2001 | |
| JP | 2003-001090 | A | 1/2003 | |
| JP | 2010-094675 | A | 4/2010 | |
| JP | 2015-100785 | A | 6/2015 | |
| JP | 2016-137479 | A | 8/2016 | |
| JP | 2019-504759 | A | 2/2019 | |
| TW | 201600178 | A | 1/2016 | |
| WO | WO-2005061089 | A1 * | 7/2005 | ............ B01D 1/18 |

OTHER PUBLICATIONS

European Patent Office, Extended European Search Report and Opinion, EP Patent Application No. 17929031.7, dated May 31, 2021, five pages.

Japan Patent Office, Notice of Allowance, JP Patent Application No. 2020-521440, dated May 24, 2021, six pages.

PCT International Search Report and Written Opinion, PCT Application No. PCT/CN2017/106330, dated Jul. 18, 2018, 14 pages (with English translation of International Search Report).

China National Intellectual Property Administration, Office Action, CN Patent Application No. 201780011664.X, dated Jul. 3, 2020, 32 pages.

* cited by examiner

ELECTROSPRAY DEVICE FOR FLUIDIZED BED APPARATUS, FLUIDIZED BED APPARATUS AND METHOD

FIELD

The present invention relates to an electrospray device used in a fluidized bed apparatus, a fluidized bed apparatus for coating particles, a fluidized bed apparatus for spray-drying a solution, a method for coating the particles in the fluidized bed apparatus and a method for spray-drying the solution in the fluidized bed apparatus.

BACKGROUND

According to the prior arts, the fluidized bed apparatus with a bottom-spray device is used for coating the particles, whereas the fluidized bed apparatus with a top-spray device is used for spray-drying the solution. Various means to different processes have been provided for upgrading the performance of the fluidized bed apparatus and improving the quality of the product, including the aerodynamic means and the electromagnetic hydrodynamic means.

In the prior patent application (PCT/CN2016/073224) of the applicant, an aerodynamic means is disclosed by introducing a swirl generator into the fluidized bed apparatus and producing a swirling upward air stream adjacent the sprayer in the up-flow bed area within the partition, which benefits the sufficient developments of the spray pattern and the particle flow pattern, optimizes the convection path of the product, and upgrades the performance of the fluidized bed apparatus, thus the quality of the product is improved. The above-mentioned prior patent application is incorporated herein by reference in its entirety to further introduce the electromagnetic hydrodynamic means of the electrospray by applying the electrospray device to the fluidized bed apparatus in the above-mentioned prior patent application, further improving the performance of the nozzle spray by introducing the Coulombic fission means, and controlling the motion behaviors of the charged droplets and the charged particles/spray-dried charged particles, thereby to benefit the more sufficient developments of the spray pattern and/or the particle flow pattern, and further to optimize the convection path of the product. Furthermore, in the spray-drying process of the solution, the fluidized bed apparatus conducts a highly efficient electromagnetic intervention for ultrafine particles produced from the spray-drying process and collects the ultrafine particles into an electrostatic trapping device by employing an electromagnetic force. Therefore, the performance of the fluidized bed apparatus is further upgraded and the quality of the product is further improved.

Various means have been provided to utilize the electrospray device for coating the particles or spray-drying the solution, such electrospray device usually includes a liquid conduit, an emission electrode formed by a nozzle at the end of the liquid conduit, an opposed electrode set corresponding to the emission electrode, a liquid pump to supply liquid to the liquid conduit, a high voltage power supply, and one or more rheostats to modify voltage. It is configured to produce a preset electric potential difference and thus to form an electric field between the emission electrode and the opposed electrode, so that the liquid supplied to the end of the emission electrode is charged, in order to release charged droplets from the end of the emission electrode. The liquid provided by the liquid pump is retained at an exit of the nozzle under the surface tension force, meanwhile a Taylor cone is formed by the liquid at the exit of the nozzle at the end of the emission electrode under the electric field force whose orientation is opposite to that of the surface tension force, and the electric charge is concentrated at the end of the Taylor cone due to the high voltage applied to the nozzle at the end of the emission electrode by the power supply. When the electric field intensity reaches a critical value, an electrostatic force produced from the electric charge is enough to overcome the surface tension force of the liquid, thus the droplets spurt out from the Taylor cone to form charged droplets. During the movement of the charged droplets from the emission electrode to the opposed electrode under the electric field force, the solvent of the charged droplets evaporates continually, and the droplet volume becomes smaller and smaller while the charge remains unchanged. When the ratio of the charge intensity on the droplet surface to the droplet radius reaches the Rayleigh instability limit, the droplets incur the Coulombic fission to form a large number of droplets in small particle size. The above-mentioned process of the solvent evaporation and the Coulombic fission which the droplets are experienced repeats over and over again. Therein, after spurted out from the nozzle, the bigger droplets experience a greater number of the Coulombic fission than the smaller droplets, such that the consequent tiny charged droplets formed by the Coulombic fission of the charged droplets in whether bigger size or smaller size are in similar size and more concentrated size distribution, thereafter the solvent of the tiny charged droplets evaporates completely and the tiny charged droplets finally are turn turned into the spray-dried charged particles. Therefore, in practical application, the electromagnetic force is utilized to control the formation condition, the motion behaviors and the depositional modes of the charged droplets and the charged particles in the electromagnetic field by means of alternating the polarities and modifying the electric potential difference between the emission electrode and the opposed electrode of the electrospray device, such that the electrospray device is adapted to requirements to different processes, such as coating the particles and spray-drying the solution, for example.

Netherlands patent application (PCT/NL2010/050155) discloses a process and an apparatus for producing coated particles by employing an electrospray device. In the process, the fluidized bed apparatus charges the particles to be coated by friction, thus the particles are turned into the charged particles, thereafter the charged particles encounter the droplets in an opposite polarity and attract each other in the spray zone, thereby the charged droplets are attracted to and combine with the surfaces of the charged particles, such that the coating of the particles is implemented. The charged droplets and the charged particles attract each other due to the opposite polarities of charge therebetween, such that the binding rate and the binding firmness between the charged droplets and the charged particles are improved. However, the process introduces means of charging the particles to be coated with the tribo-charging particles, results in an uncertain charging status of the charged particles, and impairs the quality of the coating formed by combining the charged droplets with the charged particles, and thereafter the particles need to experience an electrospray process of alternative polarities repeatedly in order to be coated to the preset extent of the coating, and results in both the structure and the process of the fluidized bed apparatus complicated, which impairs the efficiency of the fluidized bed apparatus and the quality of the product.

United States patent (U.S. Pat. No. 7,972,661B2) discloses another apparatus and method of electrospray for coating the particles, especially for introducing a biological materials as spray-dispersed particles into the target cells, in order that a better absorption between the biological materials and the target cells is enabled under the Coulombic force, and the electric field force enables the biological materials acting as the spray-dispersed charged particles to attain a velocity such that the particles forcibly contact, and preferably, penetrate the target cells when impacted. However, in one aspect, the distribution density of the spray-dispersed charged particles centers at the center point of the circular spray zone and decreases along the radial direction due to a non-uniform electric field applied to the electrospray device, results in a non-uniform spraying of the biological materials on the target cells, which impairs the quality of the process. In another aspect, even though the patent application utilizes all kinds of auxiliary conveyors to transmit the target cells to the spray zone for being subjected to a more uniform spraying, it doesn't match up to the requirements to continuous operation and mass production, thus it is difficult to scale up the process.

It is understood that the electromagnetic hydrodynamic means, which benefitting sufficient Coulombic fission of the charged droplets, controlling the motion behavior of the charged droplets under the electromagnetic force, and promoting the developments of the spray pattern and/or the particle flow pattern, improves the process and the quality of the product advantageously. The innovated electromagnetic hydrodynamic means further improves the quality of the spray atomization and the production efficiency, which ensures the maximization of the spray efficiency and the operation stability in case of increasing the spray rate, and produces high quality product with premium physical attributes. Therein, the types of nozzles commonly used are pneumatically atomized, i.e. using a high-speed jet of air in order to break a liquid jet into small droplets in a cone-shaped cloud or spray pattern, preferably two-fluid nozzle is utilized.

SUMMARY

Accordingly, a conception of the present invention is based on an application of the electromagnetic hydrodynamic means, and especially the electromagnetic hydrodynamic means that introduces an electrospray into the fluidized bed apparatus which is innovated by the aerodynamic means of providing a swirling upward air stream. The conception of the present invention introduces an electrospray device to the fluidized bed apparatus for coating the particles or spray-drying the solution. The electrospray device includes a charged nozzle as an emission electrode and a charged partition as an opposed electrode, further includes a power supply for applying voltage to the nozzle and the partition, one or more rheostats for modifying the electric potential difference between the nozzle and the partition, and a transfer switch for alternating the voltage polarities applied to the nozzle and the partition. In addition, according to the present invention, a magnetic field generator may be attached to the above-mentioned electrospray device, more particularly, the magnetic field generator is constructed by an electrified helical coil twined around the periphery of the partition, in order to generate a magnetic field inside the partition, especially an axial magnetic field relative to the swirling upward air stream.

Specifically, the conception of the present invention may be applied to a process of coating the particles, therein, for example, a high voltage is applied to the nozzle as the emission electrode and a low voltage in an opposite polarity is applied to the partition as the opposed electrode, whereby a preset electric potential difference is produced between the charged nozzle and the charged partition, and thus an electric field is formed. In addition, the conception of the present invention further consists of utilizing the magnetic field generator to produce a magnetic field inside the partition, particularly an axial magnetic field relative to the swirling upward air stream. After ejected from the nozzle, the charged droplets move along a rotational upward path similar to the Spiral of Archimedes under the joint effect of the electromagnetic field and the swirling upward air stream, and thus a sufficient Coulombic fission is generated to decrease the size of the charged droplets, and therefore the atomization of the spray is optimized and the quality of the coating is improved. Simultaneously, in the process of the rotational upward motion along the inner wall of the charged partition under the effect of the swirling upward air stream, the particles to be coated are turned into the charged particles by contacting with the inner wall of the charged partition, and the charge status of the charged particles would be stabilized along with the motion status stabilized before entering the spray zone, thereby the impairment to the quality of the coating process due to the instable charge status of the charged particles before entering the spray zone is avoided in the subsequent electrospray. According to the Coulomb's law, the charged droplets and the charged particles move in an opposite motion radially under the effect of the electric field force and attract each other under the Coulombic force due to the opposite charge polarities therebetween, and therefore the availability of the coating solution and the film forming quality of the coating film are improved. In addition, together with the electric field force and the Coulombic force, the radial Lorentz force on the charged droplets and the charged particles in the rotational upward motion, which generated from the magnetic field, may control the motion behaviors of the charged droplets and the charged particles, in order to optimize the process. In the fluidized bed apparatus, the particles are carried on in the cyclical coating process of being subjected to the electrospray in the spray zone inside the partition and drying in the weaker upward air stream outside the partition repeatedly, until to a preset extent of the coating of the particles. Therefore, the performance of the fluidized bed apparatus is upgraded, the efficiency of the process and the quality of the product are improved.

Furthermore, the conception of the present invention may be applied to a process of spray-drying a solution, therein, for example, a high voltage is applied to the nozzle as an emission electrode and a low voltage in the same polarity is applied to the partition as an opposed electrode, thereby a preset electric potential difference is produced between the charged nozzle and the charged partition, and thus the electric field is formed therebetween. In addition, the conception of the present invention further utilizes the magnetic field generator to produce a magnetic field inside the partition, especially an axial magnetic field relative to the swirling upward air stream. After ejected from the nozzle, the charged droplets move along a rotational upward path similar to the Spiral of Archimedes under the joint effect of the electromagnetic field and the swirling upward air stream. The solvent of the charged droplets evaporates continuously under the effect of the dry air stream, the droplets are transformed into numerous droplets in small size due to the Coulombic fission, and therefore the atomization effect of the spray is optimized, and the performance of producing smaller particles of the fluidized bed apparatus is upgraded. When numerous tiny droplets are formed from the electrospray after the Coulombic fission, as the solvent evaporates continuously under the effect of the dry air stream, the charge density on the surface of the tiny droplets is increasing and finally the charged droplets are turned into spray-dried charged particles due to the complete volatilization of the solvent. According to the Coulomb's law, a mutual repulsive Coulomb force is generated between the charged droplets/the charged particles and the charged partition due to the same polarity therebetween, and thus to prevent the charged droplets/the charged particles from adhesion and agglomerating on the inner wall of the charged partition, simultaneously the attrition and the collision therebetween are reduced or eliminated due to the mutual repulsive Coulomb forces between the charged droplets/the charged particles mutually and between the charged droplets/the charged particles and the charged partition. In addition, together with the electric field force and the Coulombic force, the radial Lorentz force on the charged droplets and the charged particles in the rotational upward motion, which generated from the magnetic field within the partition by the magnetic field generator, may control the motion behaviors of the charged droplets and the charged particles, such that the performance of the fluidized bed apparatus is further upgraded, the efficiency of the process and the quality of the product are further improved.

In recent years, in order to promote the application of supercritical fluid technology in the field of electrochemical reaction, the conductivity of supercritical fluid solution is further studied. All kinds of means are applied to improve the conductivity of the supercritical fluid solution, for example, introducing ionic liquids into supercritical fluid systems, which gives the conductivity to the supercritical fluid solution, and makes it possible to apply the electromagnetic hydrodynamic means of the electrospray to the spray-drying of the supercritical fluid solution, especially applicable to the preparation process of liposomes by the supercritical fluid solution. Based on this, the conception of the present invention may further apply the electromagnetic hydrodynamic means of the electrospray to the spray-drying process of the supercritical fluid solution, for example, on the basis of the above-mentioned fluidized bed apparatus adapted to the spray-drying process of the solution, the fluidized bed apparatus can be innovated by means of modifications on pressure resistance and heat insulation of the liquid supply system and the spray system, in order to be adapted to the requirements to Supercritical Anti-Solvent (SAS) and Rapid Expansion of Supercritical Solutions (RESS) Technology, such that the innovated fluidized bed apparatus may be applied to the spray-drying of the supercritical fluid solution, in order to produce ultrafine particles, especially liposomes. After ejected from the atomizing nozzle, the droplets of the supercritical fluid solution given with electrical conductivity will further experience a rapid expansion and the Coulombic fission caused by the supercritical fluid. Along with the complete evaporation of the solvent, the ultrafine particles produced from the spray-drying are loaded with high electric charge density, such that the repulsive Coulombic force is introduced among the ultrafine particles, and thus to prevent the particles from adhesion and agglomerating, and the electromagnetic force can further be utilized to control the movement of the particles, moreover the particles can be efficiently guided and collected by electrostatic trapping device.

To accomplish the above-mentioned objects, the present invention provides an electrospray device for a fluidized bed apparatus, the electrospray device comprises a sprayer and a partition positioned vertically and coaxially with the sprayer, the sprayer includes a sprayer body and a nozzle provided at a top of the sprayer, characterized in that the sprayer body is provided with a swirl generator for generating a swirling air stream, and a power supply is directly or indirectly connected between the nozzle and the partition, so as to apply voltage to the nozzle and the partition.

In a preferred embodiment according to the present invention, the power supply applies a high voltage to the nozzle and applies a low voltage to the partition.

In a preferred embodiment according to the present invention, the electrospray device has a primary rheostat arranged between the power supply and the partition, so as to decrease the high voltage applied by the power supply.

In a preferred embodiment according to the present invention, the electrospray device has a secondary rheostat, the secondary rheostat is connected between the primary rheostat and the partition with grounding, so as to further decrease the voltage already decreased by the primary rheostat.

In a preferred embodiment according to the present invention, an electric potential difference between the nozzle and the partition can be modified by adjusting the primary rheostat and the secondary rheostat of the electrospray device.

In a preferred embodiment according to the present invention, a transfer switch is provided among the power supply, the nozzle and the primary rheostat, so as to alternate the polarities of voltage applied by the power supply to the nozzle and the partition, respectively.

In a preferred embodiment according to the present invention, the primary rheostat and/or the secondary rheostat are replaced by fixed resistors.

In a preferred embodiment according to the present invention, two power supplies are provided, and two power supplies are respectively connected to the nozzle and the partition.

In a preferred embodiment according to the present invention, the partition has a magnetic field generator; the magnetic field generator is a coil which is spirally twined around a circumference of the partition, for example.

In another aspect, the present invention provides a fluidized bed apparatus for coating particles, the fluidized bed apparatus comprises a product container, a lower plenum base, and an air distribution plate resided between the product container and the plenum base, wherein the fluidized bed apparatus has the electrospray device described as above-mentioned, wherein the polarities applied by the power supply to the nozzle and the partition are opposite.

In another aspect, the present invention provides a fluidized bed apparatus for spray-drying a solution, the fluidized bed apparatus comprises a product container, a lower plenum base, an air distribution plate resided between the product container and the plenum base, wherein the fluidized bed apparatus has an electrospray device described as above-mentioned, wherein the polarities of voltage applied by the power supply to the nozzle and the partition are the same.

In a preferred embodiment according to the present invention, the solution is a supercritical fluid solution.

In a preferred embodiment according to the present invention, an electrostatic trapping device is provided to collect a spray-dried product.

In another aspect, the present invention provides a method for coating particles in a fluidized bed apparatus, the method comprising:
  providing particles to be coated;
  providing a solution to be sprayed for coating the particles to a nozzle of a sprayer by means of a solution pipeline;

providing a swirling upward air stream relative to the sprayer along the circumference outwards, so that the particles to be coated rotate upwards in the partition;

applying voltage to the nozzle and the partition, so that the solution ejected from the nozzle includes charged droplets, and the polarities applied to the partition and the nozzle are opposite.

In a preferred embodiment according to the present invention, the swirling upward air stream directs the particles to be coated to enter a rotational upward path along the inner wall of the partition, wherein the particles to be coated are charged to be turned into charged particles due to contacting with the inner wall of the partition, and the charged particles enter a spray zone along with the swirling upward air stream.

In a preferred embodiment according to the present invention, the charged droplets ejected from the nozzle move in a rotational upward motion and enter the spray zone in the partition under a joint effect of the electric field and the swirling upward air stream in the partition.

In a preferred embodiment according to the present invention, further comprises an electrospray step, wherein a high voltage is applied to the nozzle and a low voltage is applied to the partition, so that the charged particles and the charged droplets in the spray zone attract each other first due to the opposite charge polarities therebetween, wherein the charged droplets deposit on surfaces of the charged particles and are combined with the charged particles; as the charged particles are further combined with the charged droplets in the spray zone, the net charge of the charged particles is gradually decreased, the deposition of the charged droplets on the charged particle is gradually decreased, and the deposition of the charged droplets on the charged particles is finally stopped when the net charge of the charged particles comes down to zero; then the charged particles approach to and contact with the inner wall of the partition in the rotational upward path under a centrifugal force so as to be recharged.

In a preferred embodiment according to the present invention, the electrospray step can be repeated until the charged particles are turned into coated particles and leave the spray zone in the rotational upward path.

In a preferred embodiment according to the present invention, when the coated particles travel into an expansion area above the partition through the spray zone along the rotational upward path, the coated particles encounter a low-velocity air stream, which causes the coated particles to fall downwards in a downward flow bed area; in the downward path the particles are dried to such an extent that a weaker upward air stream through the surrounding area of an air distribution plate is sufficient to avoid any agglomeration in a fluidized layer, and the coated particles are dried sufficiently in the fluidized layer and then reenter the cycle of the next electrospray coating process.

In a preferred embodiment according to the present invention, the method can be repeated over and over again, until the coated particles formed after the electrospray coating process of the particles reach a preset extent of the coating.

In a preferred embodiment according to the present invention, a magnetic field effect can be applied to the charged droplets and the charged particles in a rotational upward motion in the partition by the magnetic field generator, wherein the magnetic field is an axial magnetic field relative to the swirling upward air stream, for example.

In another aspect, the present invention provides a method for spray-drying a solution in a fluidized bed apparatus, the method comprising:

providing a solution to be spray-dried to a nozzle of a sprayer by means of a solution pipeline;

providing a swirling upward air stream relative to the sprayer along the circumference outwards, wherein the swirling upward air stream is used for spray-drying the solution;

applying a voltage to the nozzle and the partition, so that the solution ejected from the nozzle includes charged droplets, and the polarities of voltage applied to the partition and the nozzle are the same.

In a preferred embodiment according to the present invention, the charged droplets ejected from the nozzle move in a rotational upward motion in the partition under a joint effect of the electric field and the swirling upward air stream in the partition, until the charged droplets are turned into spray-dried charged particles after preliminary drying.

In a preferred embodiment according to the present invention, a high voltage is applied to the nozzle and a low voltage is applied to the partition in the same polarity, so that the charged droplets and/or charged particles are repulsive mutually first due to the same polarity of charge.

In a preferred embodiment according to the present invention, an electrostatic trapping device is used to collect a spray-dried product.

In a preferred embodiment according to the present invention, wherein the solution is a supercritical fluid solution.

In a preferred embodiment according to the present invention, a magnetic field effect can be applied to the charged droplets and the charged particles in a rotational upward motion in the partition by the magnetic field generator, wherein the magnetic field is an axial magnetic field relative to the swirling upward air stream, for example.

In a preferred embodiment according to the present invention, a particle size and a particle size distribution of the spray-dried product can be controlled by adjusting configurational parameters and/or operational parameters of the electrospray device of the fluidized bed apparatus.

In a preferred embodiment according to the present invention, a motion behavior of the spray-dried product can be controlled by adjusting configurational parameters and/or operational parameters of the magnetic field generator of the fluidized bed apparatus.

By means of the electrospray device applied to the fluidized bed apparatus according to the present invention, under the effects of the Rayleigh instability limit and the Coulombic fission, the electrospray device produces relative smaller particles in more concentrated particle size distribution than that of the conventional spray device. According to the Coulomb's law, the repulsive force among the charged droplets due to the same polarity of charge makes the droplets a more uniform spatial distribution in the spray pattern with less agglomeration. Simultaneously the charged droplets and the charged particles are guidance controlled. In addition, the charged droplets and the charged particles are guided to deposit under the electromagnetic force, the attrition and the collision among the particles together with "the wall-sticking effect" of the spray are reduced or eliminated. Such that, in one aspect, a more uniform coating is achieved in the coating process of the particles, on the other hand the consequent particles produced from the spray-drying process of the solution are in smaller particle size and more concentrated particle size distribution. In another aspect, the performance of the fluidized bed apparatus to treat tiny particles is upgraded in the coating process of the particles, on the other hand the performance of the fluidized bed apparatus to produce, guide and collect the ultrafine particles is upgraded in the spray-drying process of the solution. In another aspect, the availability of the coating solution is improved in the coating process of the particles, on the other hand "the wall-sticking effect" of the spray is reduced or eliminated in the spray-drying process of the solution.

By means of the fluidized bed apparatus according to the present invention, therein an electric filed is formed between the charged nozzle and the charged partition due to an electric potential difference generated from the electrospray device therebetween, and a magnetic field is generated in the partition by the magnetic generator. The charged droplets from the electrospray move along a rotational upward path similar to an approximate Spiral of Archimedes under the joint effect of the electromagnetic field and the swirling upward air stream inside the partition, which contributes to the sufficient atomization of the spray and the sufficient development of the spray pattern under the joint effect of the Coulombic fission produced in the charged droplets and the mutual repulsive Coulombic force among the charged droplets. In the coating process of the particles, during the rotational upward motion along the inner wall of the partition under the effect of the swirling upward air stream, the particles to be coated are charged due to contacting with the inner wall of the partition, and their status of charge should be stabilized along with the motion status stabilized before entering the spray zone. The mutual repulsive Coulombic force among the charged particles/between the charged particles and the charged partition due to the same polarity of charge, which reduces or eliminates the attrition and collision among the charged particles/between the charged particles and the charged partition, so as to facilitate a sufficient development of the particle flow and to optimize the convection path of the product. In the spray-drying process of the solution, after ejected from the atomizing nozzle, the droplets produce tiny droplets due to the Coulombic fission, the ultrafine particles produced from the complete evaporation of the tiny droplets will be dried sufficiently in the rotational upward motion along the inner wall of the partition. According to the Coulomb's law, the charged partition applies a repulsive Coulombic force to the charged droplets/the charged particles due to the same polarity of charge, which prevents the charged droplets/the charged particles from sticking or agglomerating on the inner wall of the partition. Moreover, the dried charged particles travel into the air outlet of the fluidized bed apparatus along with the swirling upward air stream, the charged particles can be guided under the magnetic force and can be collected by the electrostatic trapping device.

In the fluidized bed apparatus according to the present invention, the voltage applied to the nozzle as the emission electrode and the partition as the opposed electrode can be monitored and controlled. Similarly, the current applied to the coils spirally twined around the periphery of the partition as the magnetic field generator and the consequent magnetic field therein can be monitored and controlled, so as to optimize the performance of the fluidized bed apparatus in all the process. Moreover, by means of the fluidized bed apparatus according to the present invention, due to the more uniform spatial distribution of the charged droplets and/or the charged particles in the spray pattern and/or particle flow pattern, the coated particles and/or the spray-dried particles would be given with more uniform coating thickness and/or more concentrated particle size distribution, the mutual agglomeration and adhesion among the coated particles and/or the spray-dried particles would be reduced or eliminated. In addition, by means of the fluidized bed apparatus according to the present invention, the flow characteristics of the particle flow pattern and the spray pattern in the spray zone can be optimized, such that the convection path of the product is optimized, a higher spray rate is achieved, and the quality of the product is improved.

These and other objects will become apparent from the following description of the invention.

Definition of the Terms in Usage

In the scope of the present specification and the attached contexts, the term "air" is used in its broadest aspect, which also includes atmospheric air and artificial gas.

In the scope of the present specification and the attached contexts, the term "particle" is used in its broadest aspect, which also includes particulate materials to be coated and particulate materials produced from a spray-drying process, such as micro particles, fine powder, fine particles, granules, beads, pellets, pills, capsules and mini-tablets. Especially, ultrafine particles should also be included in the present invention, such as microspheres, microcapsules, nanoparticles, composite particles and liposomes.

In the scope of the present specification and the attached contexts, the term "product" is used in its broadest aspect, which also includes semi-product in the production process and the finished product.

In the scope of the present specification and the attached contexts, the term "solution" is used in its broadest aspect, referring to liquid comprising solute dissolved or suspended in solvent, which also includes supercritical fluid solution employing supercritical fluid as solvent or one of solvents.

In the scope of the present specification and the attached contexts, the term "coating" is used in its broadest aspect, referring to spraying film-former on outside surface of particulate materials, forming a multifunctional protective layer adhering firmly on the outside surface after dried, the multifunctional protective layer referred to as coating.

In the scope of the present specification and the attached contexts, the term "spray-drying" is used in its broadest aspect, not only referring to the transforming process of the solid from dissolved or suspended status in liquid to powdery or massive status, but also referring to the production process by means of atomizing and vaporizing the feed liquid in order to agglomerate materials.

In the scope of the present specification and the attached contexts, the term "electromagnetic hydrodynamics" is used in its broadest aspect, which researches on the kinematic law of the charged fluid or the conductive fluid, especially regarding to the science of the kinematic law for them in the electromagnetic field.

In the scope of the present specification and the attached contexts, the term "electromagnetic force" is used in its broadest aspect, which is a generic term of the force that the charge and the current are exerted in the electromagnetic field. "Electromagnetic force" typically includes the Coulombic force, the electric field force, the Lorentz force and the Ampere force. Especially, mainly referring to the Coulombic force, the electric field force, the Lorentz force in the present invention.

In the scope of the present specification and the attached contexts, the term "supercritical fluid" is used in its broadest aspect, which refers to the fluids with the properties of both liquid and gas as the temperature and the pressure are in above the critical points, in some cases the subcritical fluids are also included. Supercritical fluid solution is a kind of solution, in which supercritical fluid is the said solvent or one of the said solvents. For example, the useful supercritical fluids are liquid carbon dioxide, water, methane, ethane, propane, ethylene, propylene, methanol, ethanol and acetone etc. Preferably, supercritical fluid is selected from carbon dioxide, water and ethanol. More preferably, the supercritical fluid is carbon dioxide.

In the scope of the present specification and the attached contexts, the term "SAS technology" (the supercritical antisolvent technology) is used in its broadest aspect, in which the materials introduced are first dissolved in the appropriate organic solvent, and then the solution is mixed with the supercritical solvent, therein the supercritical solvent dissolves the organic solvent and precipitates out the ultrafine particles.

In the scope of the present specification and the attached contexts, the term "RESS technology" (the rapid expansion of supercritical solution technology) is used in its broadest aspect, in which the solid material introduced is first dissolved in the supercritical fluid in order to form a supercritical fluid solution, and then the supercritical fluid solution expands after discharged from a nozzle with a rapid density decrease, and results in a high supersaturation to produce the ultrafine particles.

DETAILED DESCRIPTION

Figure 1:
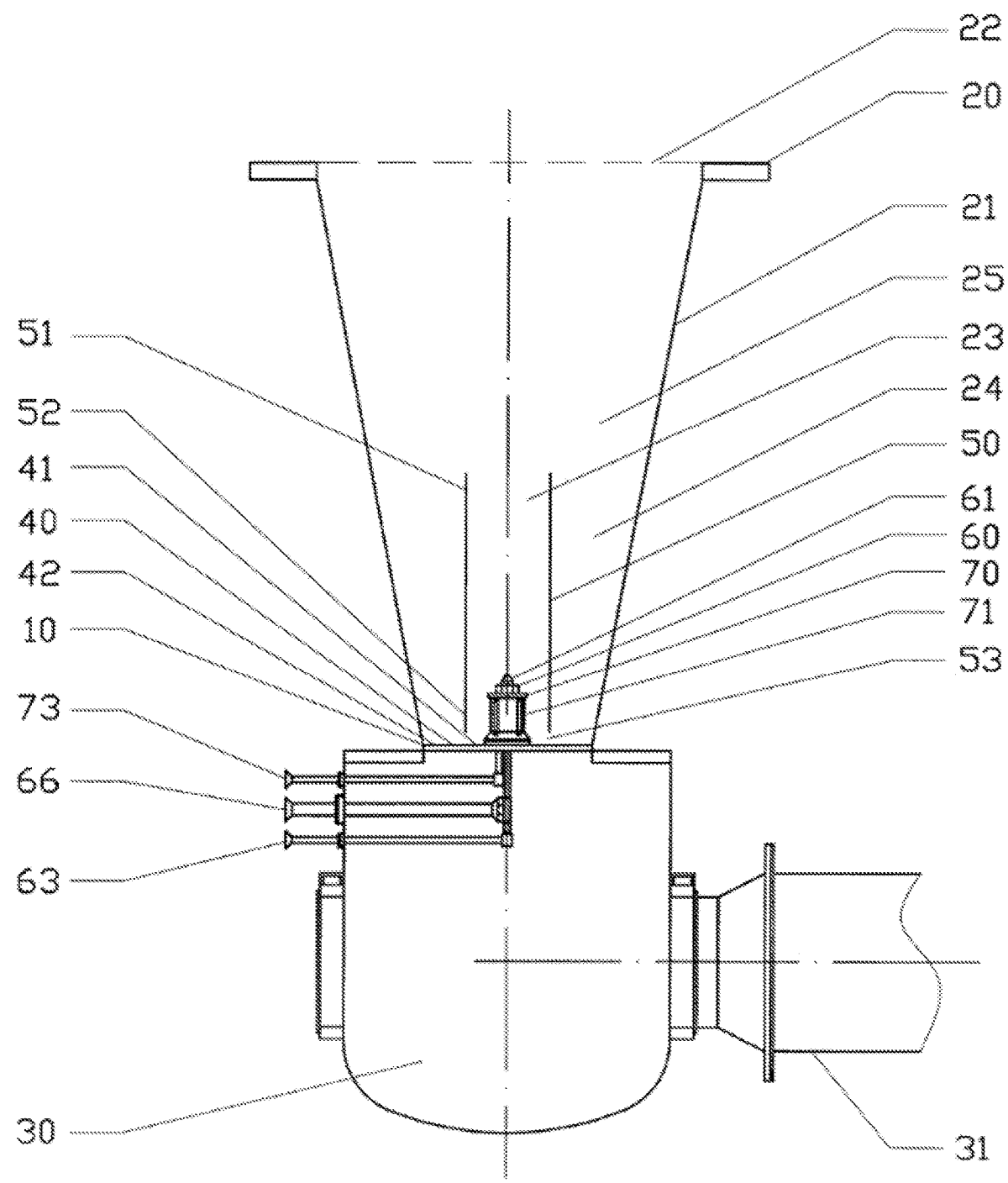
FIG. 1 is an axial sectional side view of the fluidized bed apparatus according to the prior patent application under the present applicant.
Figure 2:
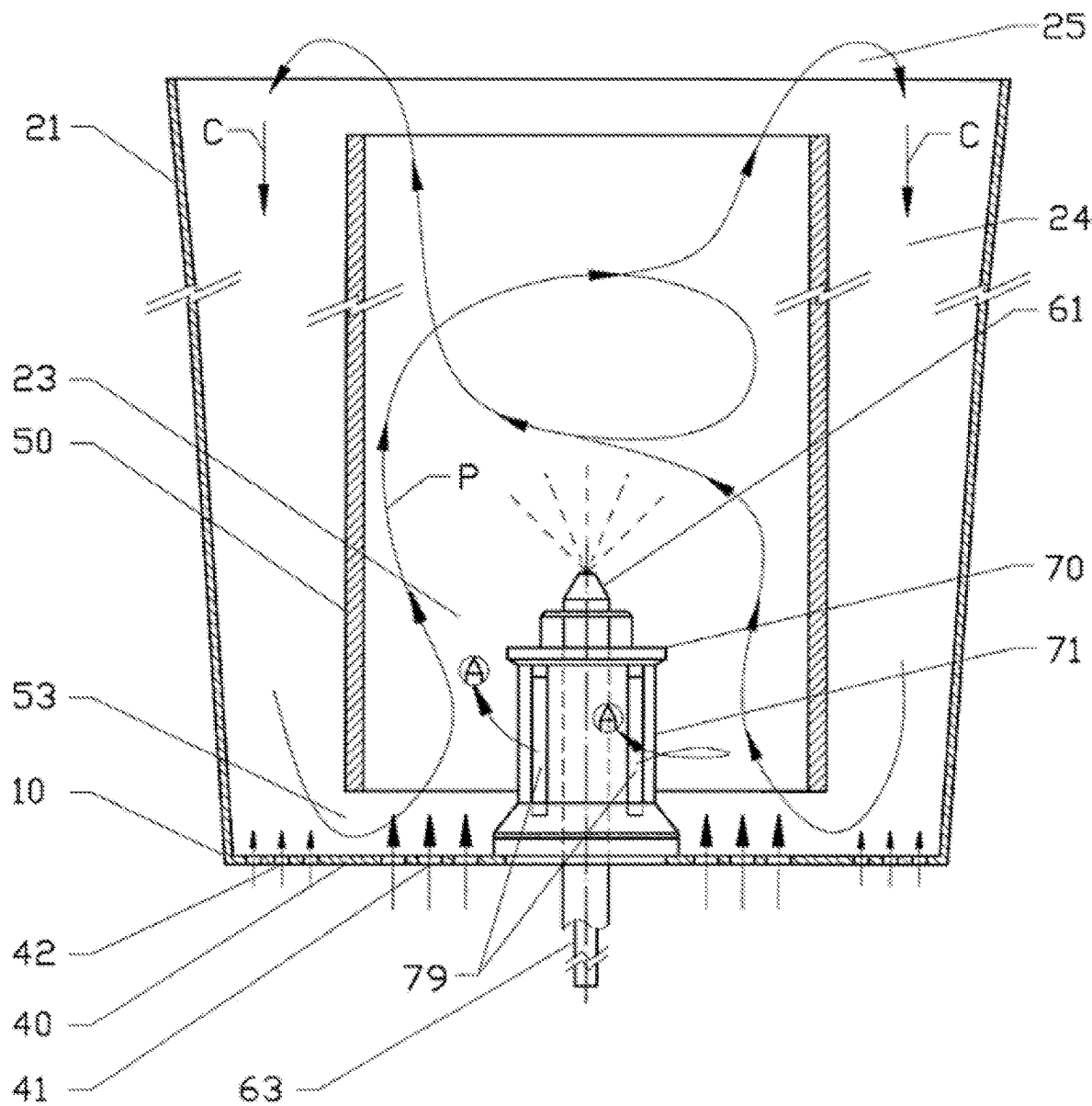
FIG. 2 is an axial sectional side view of the fluidized bed apparatus with the swirl generator according to the prior patent application under the present applicant, wherein the convection path of the product is illustrated.

With reference to FIG. 1 and FIG. 2, the fluidized bed apparatus 10 generally comprises a product container 20 which includes an expansion chamber 21 for containing the particles, a lower plenum base 30 disposed beneath the product container 20, an air distribution plate 40 resided between the product container 20 and the plenum base 30, a sprayer 60, and a swirl generator 70 combined with the sprayer 60. The upper end 22 of the product container 20 may be opened so as to be connected to an air filter housing (not shown) disposed hereabove, which comprises a filter structure and an air outlet. An inlet duct 31 extends from a primary air source (not shown) into the plenum base 30.

The air distribution plate 40 comprises a plurality of air passage apertures 41 and 42, through which the air stream from the lower plenum base 30 may enter the product container 20. A partition 50 which is usually cylindrical-shaped suspends in the center of the container 20 and separates the container 20 into a central upward flow bed area 23 and a surrounding downward flow bed area 24. The partition 50 includes an opened upper end 51 and an opened lower end 52, wherein the upper end 51 extends upwards into an expansion area 25 aerodynamically defined between the upward flow bed area 23 and the downward flow bed area 24, while the lower end 52 suspends above the air distribution plate 40 and forms an annular slit 53 with the air distribution plate 40. The apertures 41 of the air distribution plate 40 inside the vertical projection area of the partition 50 are larger in diameter than the apertures 42 outside the vertical projection area of the partition 50, which results in a stronger upward air stream in higher air volumes and velocities in the area with aperture 41 and a weaker upward air stream in lower air volumes and velocities in the area with aperture 42. The swirl generator 70 is disposed beneath the sprayer 60 and combined with the sprayer 60. Guiding slots 79 extend outwards as radial tangents in the wall of the tubular sleeve member 71 (not shown). More particularly, the guiding slots 79 are arranged in rotational symmetry along the circumference of the sleeve 71 and extend outwards as radial asymptotic tangents in the wall of the sleeve 71 (not shown), so as to provide a swirling air stream circumferentially outwards relative to the sprayer 60, as represented by arrow A in FIG. 2. The secondary air pipeline 73 provides compressed air for the swirl generator 70 in order to produce swirling air stream.

With reference to FIG. 2, a swirling upward air stream is generated in the upward flow bed area 23 under the joint effect of the stronger upward air stream and the swirling air stream. The swirling upward air stream at high velocity carries the particles into a rotational upward path and allows a sufficient development of the particle flow pattern, which facilitates the particles to be subjected to a spray when subsequently passing through the spray zone above the nozzle 61, as represented by arrow P in FIG. 2. When the particles wetted by the spray zone travel into the expansion area 25 above the partition 50, the particles encounter a weaker upward air stream at a low velocity here, which causes the particles to fall downwards in the downward flow bed area 24, as represented by arrow C in FIG. 2. In the downward path, the particles are dried to such an extent that the weaker upward air stream through the surrounding area of the air distribution plate 40 is sufficient to avoid any agglomeration in the fluidized layer. Due to the suction generated from the swirling upward air stream on the annular slit 53, the particles are then sucked into the upward flow bed area 23 through the annular slit 53. Such that, the coating process of the particles in the upward flow bed area 23 and the drying process thereof in the downward flow bed area 24 forms a circulation.

Thereby, in terms of the particles, a central upward flow bed area 23 and a surrounding downward flow bed area 24 separated by the partition 50 are aerodynamically formed in the product container 20. A sprayer 60 combined with the swirl generator 70 is disposed vertically in line with the central axis of the partition 50 and extends through the air distribution plate 40 into the upward flow bed area 23 of the container 20. A nozzle 61 is provided at the top of the sprayer 60, and the nozzle 61 receives compressed air provided from a primary air pipeline 66 connected to an air supply source (not shown) and sprays solution under pressure provided from the fluid line 63 connected to a liquid supply source (not shown), as best seen in FIG. 1.

The above description on the structure of the fluidized bed apparatus 10 is disclosed in the prior patent application under the present applicant, as known in the art.

First Embodiment

According to the first embodiment of the present invention, based on the fluidized bed apparatus 10 of the prior patent application under the present applicant, an electrospray device 1 for the fluidized bed apparatus 10 is provided, which further improves the performance of the fluidized bed apparatus 10 by means of the electromagnetic dynamics of electrospray based on the fluidized bed apparatus 10 of the above-mentioned prior patent application by the aerodynamic means of the swirling upward air stream, such that the fluidized bed apparatus 10 is adapted to the coating process of the particles or the spray-drying process of the solution.

Figure 3:
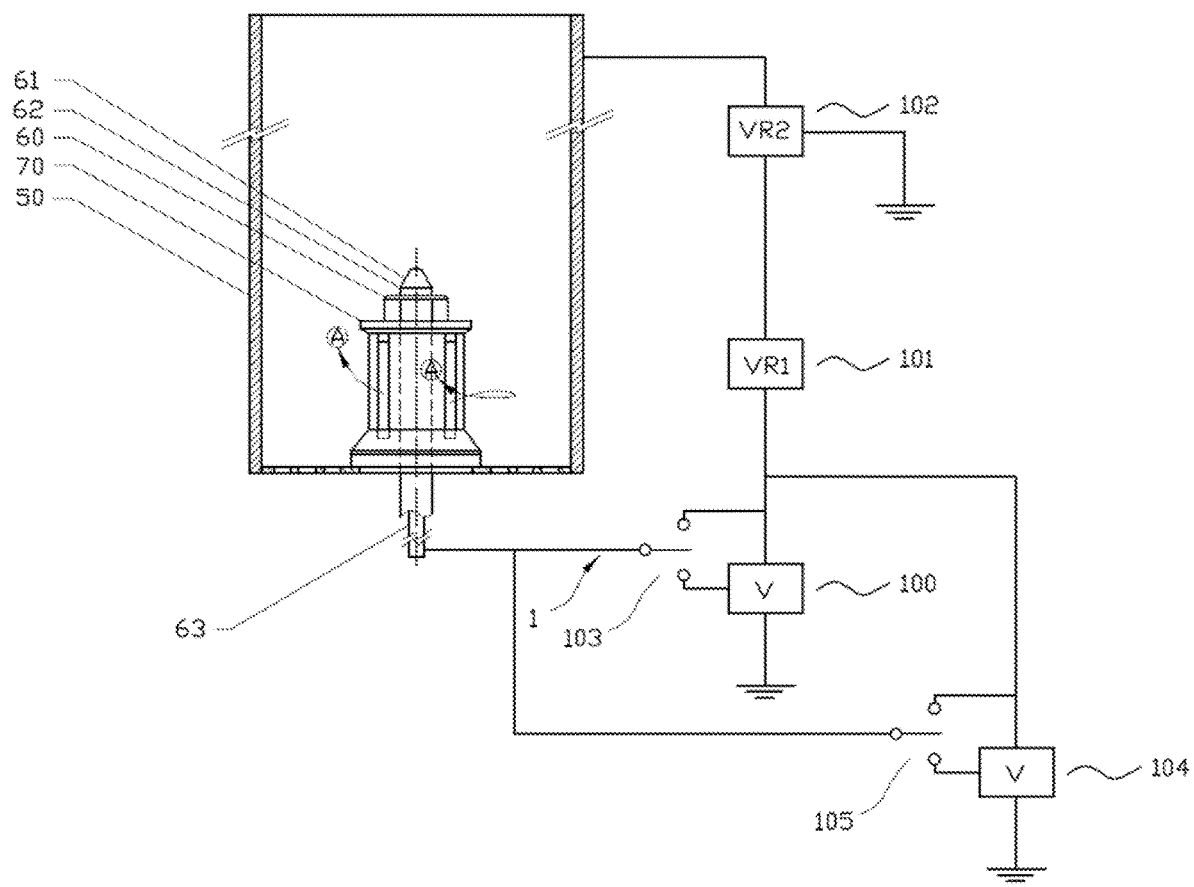
FIG. 3 is an axial sectional side view of the electrospray device used in the fluidized bed apparatus according to the first embodiment of the present invention, wherein the circuit setting of the electrospray device is illustrated.

With reference to FIG. 3, the electrospray device 1 according to the present invention comprises a sprayer 60 and the partition 50 disposed vertically in line with the central axis of the sprayer 60. The sprayer 60 includes the sprayer body 62 and a nozzle 61 provided at the top of the sprayer 60, wherein the sprayer body 62 is equipped with a swirl generator 70 in order to generate a swirling air stream, and a power supply 100 is connected between the nozzle 61 and the partition 50 directly or indirectly in order to apply voltage to the nozzle 61 and the partition 50, more particularly, the power supply 100 applies voltage to the nozzle 61 via the fluid line 63. In practical application, the power supply 100 applies a high voltage to the nozzle 61 and a low voltage to the partition 50. The primary rheostat 101 may be installed to decrease the high voltage from the power supply 100, so as to modify the electric potential difference between the nozzle 61 and the partition 50. Moreover, the secondary rheostat 102 may be additionally installed to be connected between the primary rheostat 101 and the partition 50 with grounding, so as to further decrease the voltage decreased by the primary rheostat 101. Wherein, a transfer switch 103 may be further installed to be connected to the power supply 100, the fluid line 63 connected to the nozzle 61 and the primary rheostat 101, so as to alternate the polarities of the voltage which the power supply 100 applies to the nozzle 61 and the partition 50 respectively, such that the electrospray device 1 is adapted to functional transformation between the coating the particles and spray-drying the solution by means of alternating the transfer switch 103. In the present embodiment, although the primary rheostat 101 and the secondary rheostat 102 are used for modifying the electric potential difference between the nozzle 61 and the partition 50 as rheostats which can also be substituted with fixed resisters. Moreover, the configurational combination of one single power supply 100 and two rheostats 101, 102 can be further substituted with which of two power supplies 100 and 104, which are connected to the nozzle 61 and the partition 50 respectively in order to apply voltages to the nozzle 61 and the partition 50 respectively. Wherein, a transfer switch 105 is installed to be connected to the power supply 104.

Figure 4A:
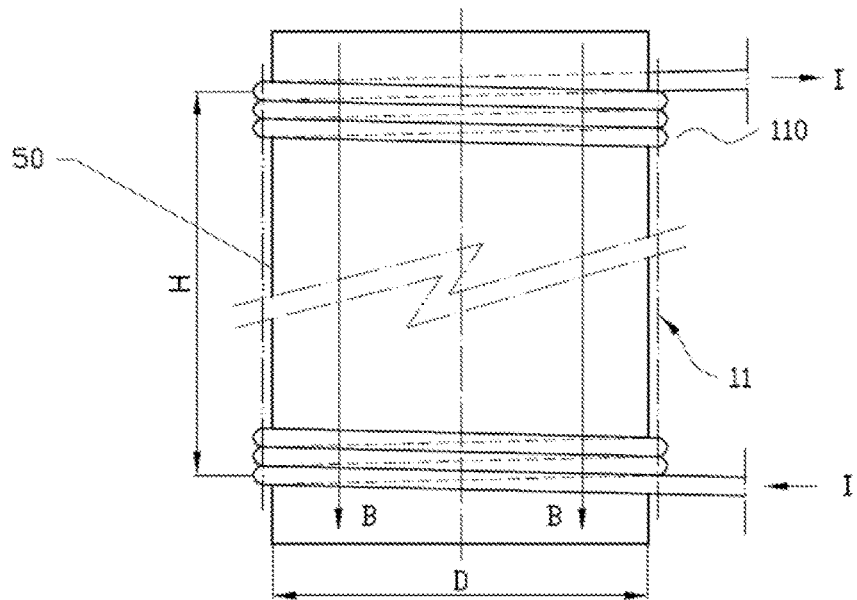
FIG. 4a is a view of the magnetic field generator according to the first embodiment of the present invention, wherein the structure of the magnetic field generator is illustrated.
Figure 4B:
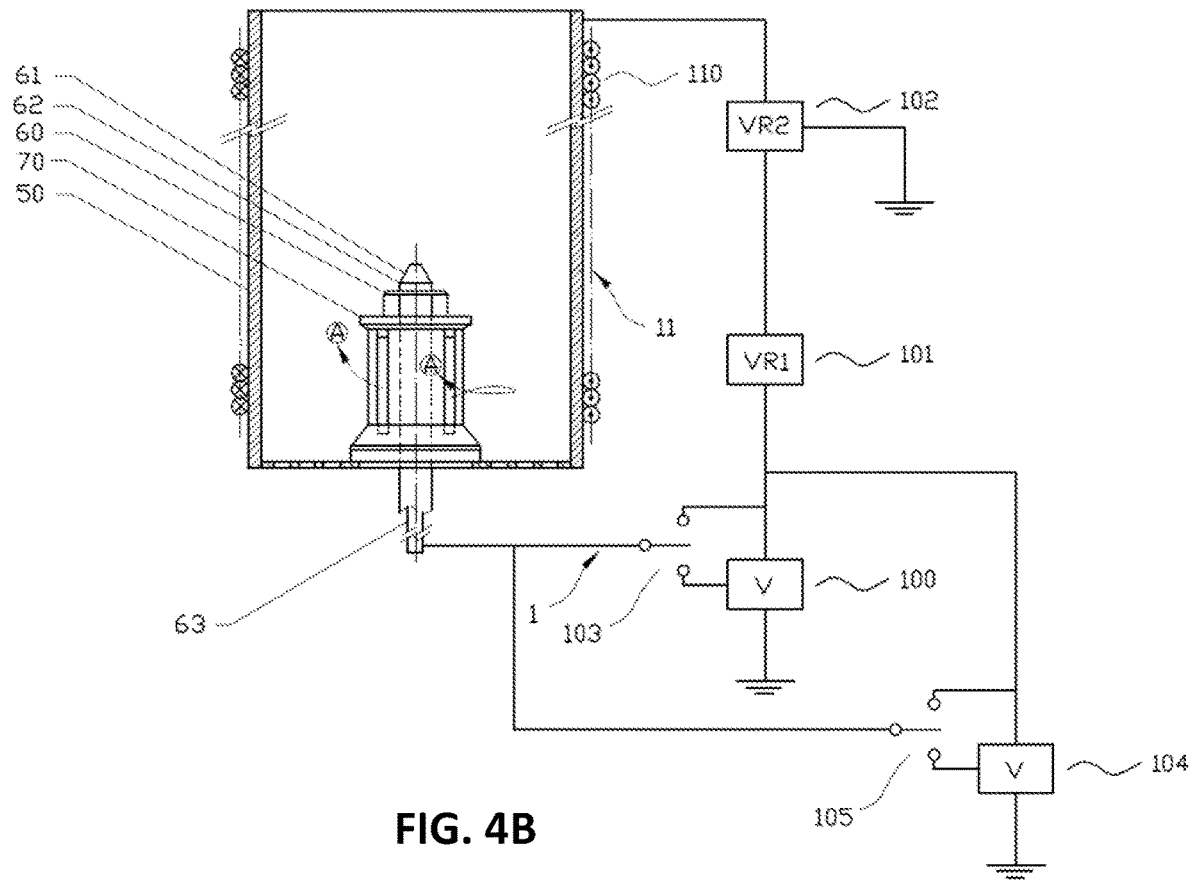
FIG. 4b is an axial sectional side view of the electrospray device with the magnetic field generator appended according to the first embodiment of the present invention, wherein the circuit setting of the electrospray device and the structure of the magnetic field generator are illustrated.

With reference to FIG. 4a and FIG. 4b, a magnetic field generator 11 can be appended to the partition 50 of the electrospray device 1 in order to generate a magnetic field within the partition 50, which cooperates and promotes the function of the electrospray device 1 of the fluidized bed apparatus 10. More particularly, the magnetic field generator 11 is constructed of electrified helical coil 110 twined around the periphery of the partition 50. When loading current I for coil 110, according to the Ampere rule, the electrified coil 110 produces a magnetic field B within the partition 50, which is an axial magnetic field relative to the swirling upward air stream, as best seen in FIG. 4a. Wherein, the distribution of the magnetic field B within the partition 50 can be altered by modifying the ratio H/D namely the axial height H of the coil 110 to the diameter D of the partition 50. When H/D the magnetic field generator 11 can produce an approximate uniform axial magnetic field B within the partition 50. Moreover, the distribution pattern and the intensity of the magnetic field B can be modified by altering the turn density of the coil 110 or the layers of the coil 110 twined around the periphery of the partition 50 in the magnetic field generator 11. When the direction or the intensity of the current I loaded on the coil 110 are adjusted, the direction or the intensity of the magnetic field B produced from the electrified coil 110 in the partition 50 would be modified accordingly.

Second Embodiment

According to the second embodiment of the present invention, based on the electrospray device 1 used in the fluidized bed apparatus 10 in the first embodiment of the present invention, a fluidized bed apparatus 10 is provided for coating particles R, which includes a product container 20, a lower plenum base 30 disposed beneath, and an air distribution plate 40 resided between the product container 20 and the plenum base 30, with reference to FIG. 1. The fluidized bed apparatus 10 further comprises the electrospray device 1 according to the first embodiment of the present invention, a liquid supply source (not shown) provides a solution to be sprayed to the nozzle 61 via the fluid line 63, and then the power supply 100 applies a high voltage to the nozzle 61 via the fluid line 63 and a low voltage to the partition 50 in an opposite polarity for coating particles R by means of setting the transfer switch 103 on the designated closed key position, as best seen in FIG. 5.

Figure 5:
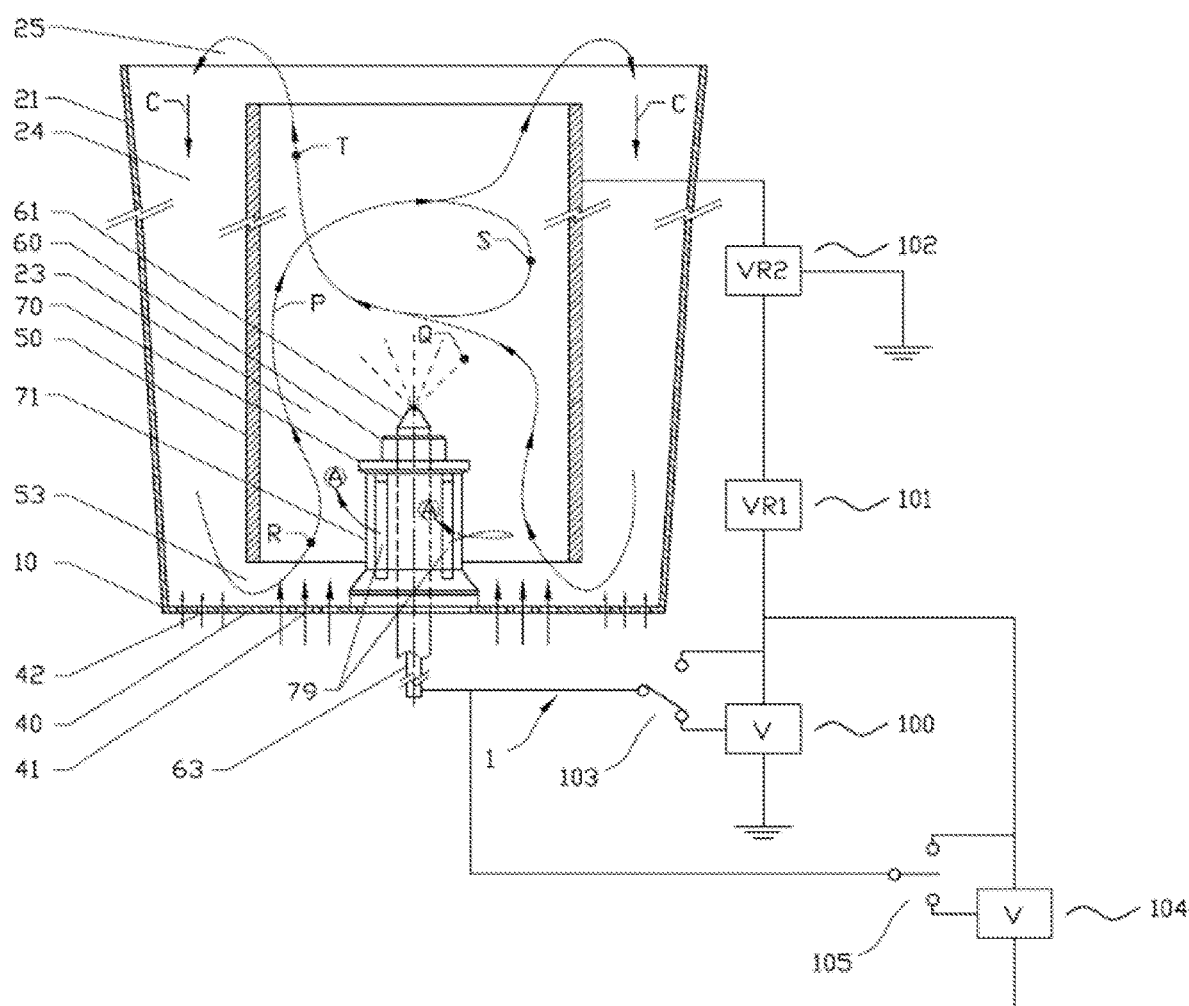
FIG. 5 is an axial sectional side view of the fluidized bed apparatus comprising the electrospray device according to the second embodiment of the present invention, wherein the circuit setting of the electrospray device and the convection path of the product are illustrated.

FIG. 5 is an axial sectional side view of the fluidized bed apparatus 10 comprising the electrospray device 1 according to the present invention. Due to the high voltage to the nozzle 61 and the low voltage to the partition 50 in an opposite polarity applied by the power supply 100, a preset electric potential difference is produced and therefore an electric field is formed between the charged nozzle 61 and the charged partition 50. Furthermore, the balance existing on the surface of the solution between the electric field force applied by the electric field and the surface tension force of the solution is broken, therefore, the surface of the solution is broken and a large number of charged droplets Q are produced, which is highly charged so as for the charged electric capacity of the charged droplets Q to reach the Rayleigh's instability limit, and the condensation effect among the charged droplets Q mutually is blocked due to the same polarity of charge on the charged droplets Q, and the dispersion effect is strengthened. After ejected from the nozzle 61, the highly charged droplets move along a rotational upward path similar to the Spiral of Archimedes under the joint effect of the electric field and the swirling upward air stream, and results in a sufficient Coulombic fission. Therefore, the consequent charged droplets Q are extremely tiny, which is in size from about one micron to dozens of microns.

FIG. 5 also shows the convection path of the product in the fluidized bed apparatus 10 including the electrospray device 1 according to the present invention. A swirling upward air stream is generated in the upward flow bed area 23 under the joint effect of the stronger upward air stream and the swirling air stream. The swirling upward air stream at high velocity carries the particles R into a rotational upward path, as represented by arrow P in FIG. 5. The particles R are turned into the charged particles S due to the contact charge with the inner wall of the partition 50. More sufficient contacts among the charged particles S mutually and between the charged particles S and the inner wall of the partition 50 are conducted along with extending of the rotational upward path of the charged particles S in the partition 50, thereby opportunities for the charged particles S to obtain a more uniform distribution of charge, whose status of charge would be stabilized along with the stabilization of the motion status before entering the spray zone. The mutual repulsive Coulombic force is produced among the charged particles S and between the charged particles S and the charged partition 50 for carrying electric charges in the same polarity, such that it is avoided that the direct mutual collision among the charged particles S in the particle flow travelling along the rotational upward motion, so as to reduce or eliminate the attrition and collision among the charged particles S mutually and between the charged particles S and the charged partition 50.

The charged particles S is prevented from mutual agglomeration and adhesion, "the wall-sticking effect" of the spray is avoided, and the availability of the coating solution is improved.

Then, the charged particles S enter the spray zone along with the swirling upward air stream at high velocity. In the spray zone, the mutual attractive Coulombic force is produced between the charged particles S and the charged droplets Q due to the opposite polarities of charge, and the charged droplets Q are deposited on the surface of charged particles S and combined with them. The charged droplets Q are sufficiently extended on the surface of the charged particles S and a uniform liquid film is formed under the effect of the Coulombic force, such that the bonding between the charged droplets Q and the charged particles S is very good. Although in the beginning the bonding depends on the electrostatic charge difference between the charged droplets Q and the charged particles S, studies show that even when the charge difference is balanced, this kind of bonding is still very good. In general, the solid coating film is formed along with the solvent evaporation of the liquid coating film on the surface of the charged particles S, and the final bonding between the coating film and the substrate layer of the charged particles S is based on the Van der Waals force.

Along with being subjected to continuous spray of the charged droplets Q from the electrospray, the net charge of the charged particles S gradually decreases, and the deposition of the charged droplets Q on the charged particles S gradually decreases correspondingly. When the net charge of the charged particles S comes down to zero, the deposition of the charged droplets Q on the charged particles S is finally stopped. At this time, charged particles S approach to and contact with the inner wall of said partition 50 in the rotational upward path under a centrifugal force, so as to be recharged, and the charged particles S are preliminarily dried in the swirling upward air stream during the process. After recharged and preliminarily dried, the charged particles S travel to the inner side of a spiral particle flow moving along a rotational upward path due to the repulsive force from the charged partition 50 and being subjected to the electrospray spray once more (not shown). When moving continuously in the fluidized bed 10, the particles R are turned into the charged particles S after charged. The process of the charged particles S being subjected to an electrospray spray alternates according to the above rules, until the charged particles S experience a complete electrospray coating process to be turned into the coated particles T and leave the spray zone in the rotational upward path. Therefore, in the spray zone, a large number of preliminarily dried charged particles S adapted to being subjected to the electrospray are selectively enriched in the inner side of a spiral particle flow moving along a rotational upward path, so that the charged particles S are subjected to a more uniform spraying in the electrospray coating process, therefore, the quality of coating film is improved.

When the coated particles T travel into the expansion area 25 above the partition 50 moving along a rotational upward path after passing through the spray zone, the coated particles T encounter a weaker upward air stream at a low velocity, which causes the particles T to fall downwards in the downward flow bed area 24, as represented by arrow C in FIG. 5. In the downward path, the coated particles T are dried to such an extent that the weaker upward air stream through the surrounding area of the air distribution plate 40 is sufficient to avoid any agglomeration in the fluidized layer, and the coated particles T reenter the cycle of the next electrospray coating process after dried sufficiently in the fluidized layer. Due to the suction generated from the swirling upward air stream on the annular slit 53, the coated particles are then sucked into the upward flow bed area 23 through the annular slit 53. In such a way, the coating process of the coated particles T which are subjected to the electrospray in the upward flow bed area 23 and the drying thereof in the downward flow bed area 24 forms a circulation.

FIG. 5 shows the convection path of the product in the fluidized bed apparatus 10 including the electrospray device 1 according to the present invention, wherein the particles R are turned into the charged particles S after being charged, the charged particles S are turned into the coated particles T after being subjected to the electrospray, and subsequently the coating process that the coated particles T experienced will repeats over and over again, until the coated particles T are coated to a preset coating extent, after which the coated product is removed from the container 20.

Figure 6:
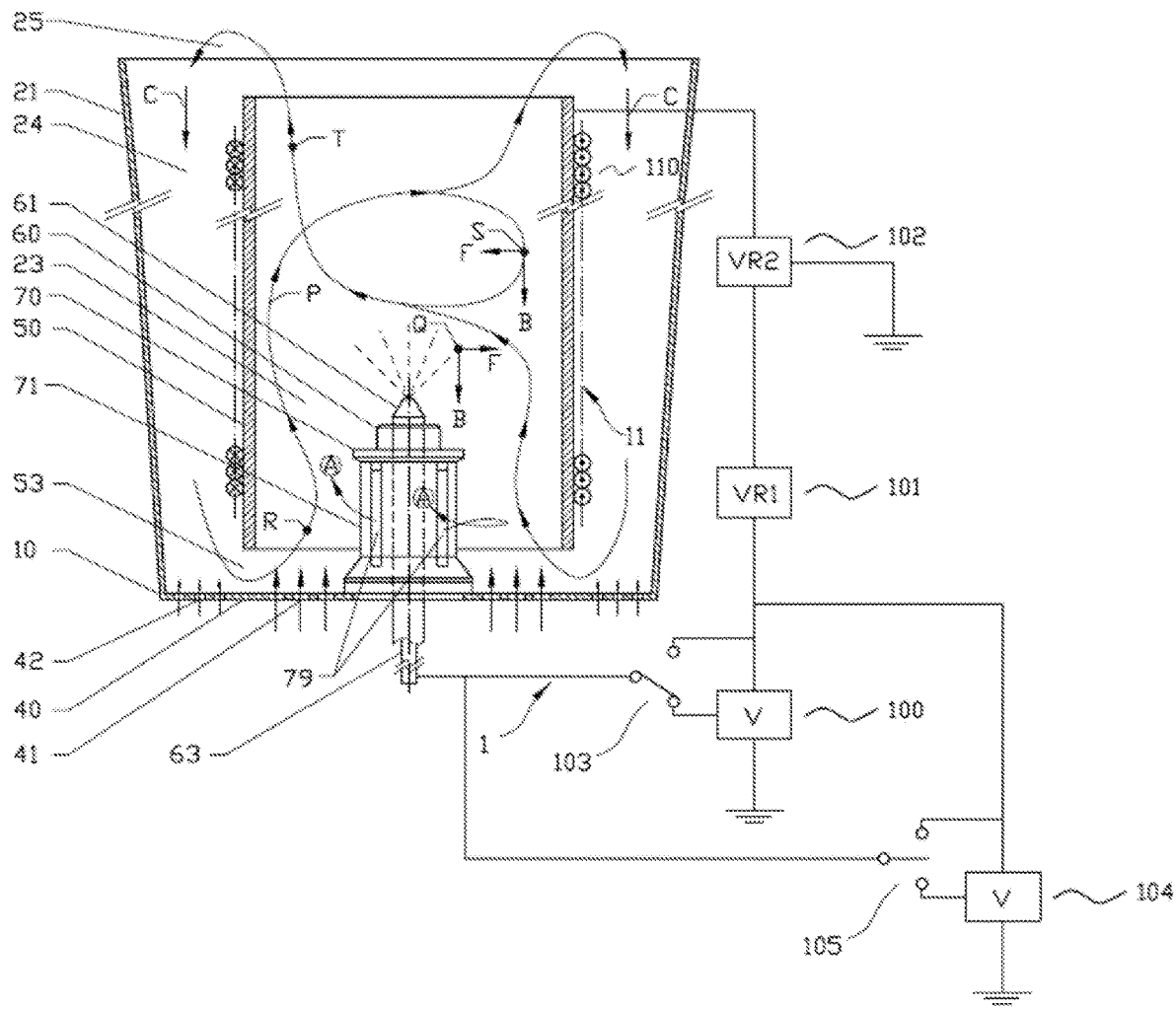
FIG. 6 is an axial sectional side view of the fluidized bed apparatus with the magnetic field generator appended according to the second embodiment of the present invention, wherein the circuit setting of the electrospray device, the structure of the magnetic field generator and the convection path of the product are illustrated.

FIG. 6 shows the fluidized bed apparatus 10 appended with the electrospray device 1 according to the present invention, wherein further shows the convection path of the product in the process of coating the particles R. The embodiment shown in FIG. 6 differs from which shown in FIG. 5 lies in that the electrified magnetic field generator 11 generates a magnetic field B in axial direction, which is an axial magnetic field relative to the swirling upward air stream in the partition 50. The charged droplets Q and the charged particles S travel in the same orientation under the effect of the swirling upward air stream. Due to the opposite polarities of charge on the charged droplets Q and the charged particles S therebetween, the radial directions of the Lorentz forces applied respectively to the charged droplets Q and the charged particles S in motion by the axial magnetic field B within the partition 50 are opposite. For example, the magnetic field B produces a centrifugal Lorentz force F for the charged droplets Q in motion and a centripetal Lorentz force F for the charged particles S in motion respectively, such that the occurrence of the charged droplets Q and the charged particles S is facilitated. The above-mentioned function of the magnetic field generator 11 benefits the sufficient developments of the spray pattern and the particle flow pattern further, and therefore the fluidized bed apparatus 10 enables a more effective control on the movements of the charged droplets Q and the charged particles S.

The electrospray device 1 of the fluidized bed apparatus 10 shown in FIG. 5 and FIG. 6 provides an electromagnetic hydrodynamic means of electrospray for the coating process of the particles R. In one aspect, it contributes to the sufficient developments of the spray pattern and the particle flow pattern as well as optimizes the convection path of the product, so as to improve the spray rate and the availability of the coating solution. In another aspect, it optimizes the spray performance to provide a more uniform coating of the product, such that the qualities of the process and the product are improved.

Third Embodiment

According to the third embodiment of the present invention, based on the electrospray device 1 for the fluidized bed apparatus 10 in the first embodiment of the present invention, a fluidized bed apparatus 10 is provided for spray-drying a solution, which includes a product container 20, a lower plenum base 30 disposed beneath, an air distribution plate 40 resided between the product container 20 and the plenum base 30, with reference to FIG. 1.

The fluidized bed apparatus 10 further comprises the electrospray device 1 constructed according to the first embodiment of the present invention, and a liquid supply source (not shown) provides a solution to be sprayed to the nozzle 61 via the fluid line 63, and then the power supply 100 applies a high voltage to the nozzle 61 via the fluid line 63 and a low voltage to the partition 50 in the same polarity for spray-drying the solution by means of setting the transfer switch 103 on the designated closed key position, as best seen in FIG. 7.

FIG. 7 is an axial sectional side view of the fluidized bed apparatus 10 comprising the electrospray device 1 according to the present invention. Due to the high voltage to the nozzle 61 and the low voltage to the partition 50 in the same polarity applied by the power supply 100, a preset electric potential difference is produced and therefore an electric field is formed between the charged nozzle 61 and the charged partition 50. The performance of the charged droplets U shown in FIG. 7 of the third embodiment is similar to that of the charged droplets Q shown in FIG. 5 of the second embodiment. After ejected from the nozzle 61, the charged droplets U move along a rotational upward path similar to the Spiral of Archimedes in the partition 50 under the joint effect of the electromagnetic field and the swirling upward air stream. However, although the voltage applied to the partition 50 is low, it has the same polarity as the charged droplets U, therefore, the inner wall of the charged partition 50 applies a repulsive Coulombic force to the charged droplets U. In the process of the rotational upward motion similar to the Archimedes spiral in the partition 50, the charged droplets U are prevented from "the wall-sticking effect" on the inner wall of the charged partition 50, until the charged droplets U are turned into spray-dried charged particles V after preliminary drying. The consequent charged particles V are extremely tiny, which is in size from about a few nanometers to a few hundred nanometers.

When the spray-dried particles V travel into the expansion area 25 above the partition 50, the spray-dried particles V encounter a weaker upward air stream at a low velocity here, which enables the particles V still to move upwards in the downward flow bed area 24 as the charged particles V are extremely tiny, as represented by arrow E in FIG. 7. The charged particles V are dried sufficiently in the upward path and enriched with high charge density on the surface due to the evaporation of the solvent on its surface, and the charged particles V with high charge density is adapted to be guided into the electrostatic trapping device (not shown).

FIG. 7 shows the convection path of the product in the fluidized bed apparatus 10 comprising the electrospray device 1 according to the present invention, wherein the formational processes of the charged droplets U after ejected from the charged nozzle 61 and the charged particles V from drying of the charged droplets U continue, until all the solution is ejected out, subsequently, a spray-dried product is guided into the electrostatic trapping device (not shown).

FIG. 8 shows the fluidized bed apparatus 10 appended with the magnetic field generator 11 according to the present invention, wherein further shows the convection path of the product in the spray-drying process of the solution. The embodiment shown in FIG. 8 differs from which shown in FIG. 7 lies in that, the electrified magnetic field generator 11 loaded by current I generates a magnetic field B in axial direction in the partition 50. The charged droplets U and the spray-dried charged particles V travel in the same orientation under the effect of the swirling upward air stream. Due to the same polarity of charge carried on the charged droplets U and the charged particles V, the Lorentz forces in the same radial orientation are applied respectively to the charged droplets U and the charged particles V in motion by the axial magnetic field B within the partition 50. For example, the magnetic field B applies the centripetal Lorentz forces F to the charged droplets U and the charged particles S in motion respectively, the charge densities on the surfaces of the charged droplets U and the charged particles V increase gradually along with the evaporation of the solvent, i.e. the charge-to-mass ratios of the charged droplets U and the charged particles V increase gradually, thus the rotation radius of the charged droplets U and charged particles V in a rotational upward motion in the magnetic field B gradually decreases. Especially the converging effect of the spray-dried charged particles V is generated; thereby the magnetic field B controls and restrains the movements of the charged droplets U and the charged particles V. Therefore, the magnetic field generator 11 helps prevent from "the wall-sticking effect" of the spray, and prevent from the aggregation and adhesion of the charged particles V on the inner wall of the partition 50, such that the fluidized bed apparatus 10 can be used for spray-drying the solution more efficiently.

Figure 7:
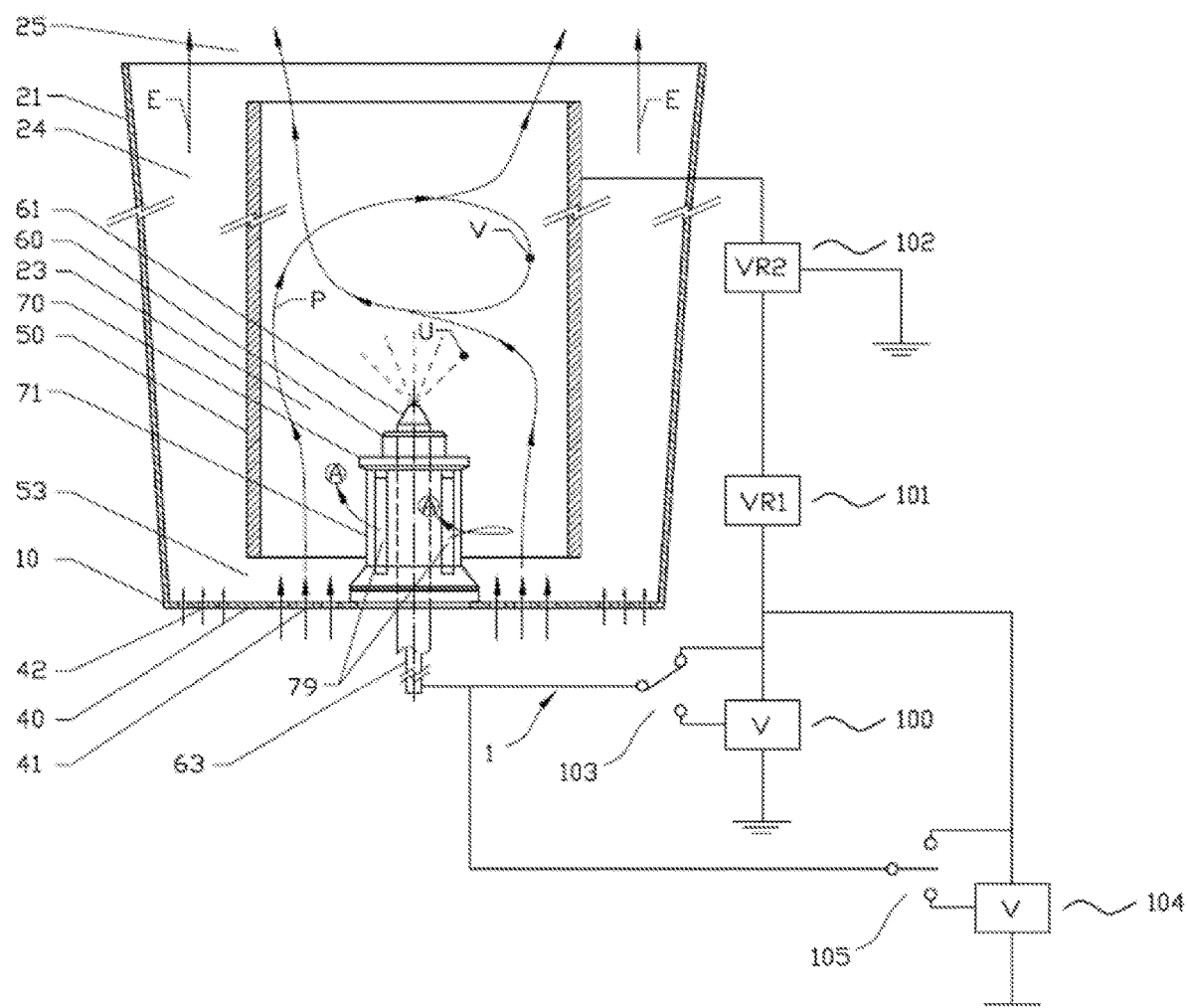
FIG. 7 is an axial sectional side view of the fluidized bed apparatus comprising the electrospray device according to the third embodiment of the present invention, wherein the circuit setting of the electrospray device and the convection path of the product are illustrated.
Figure 9:
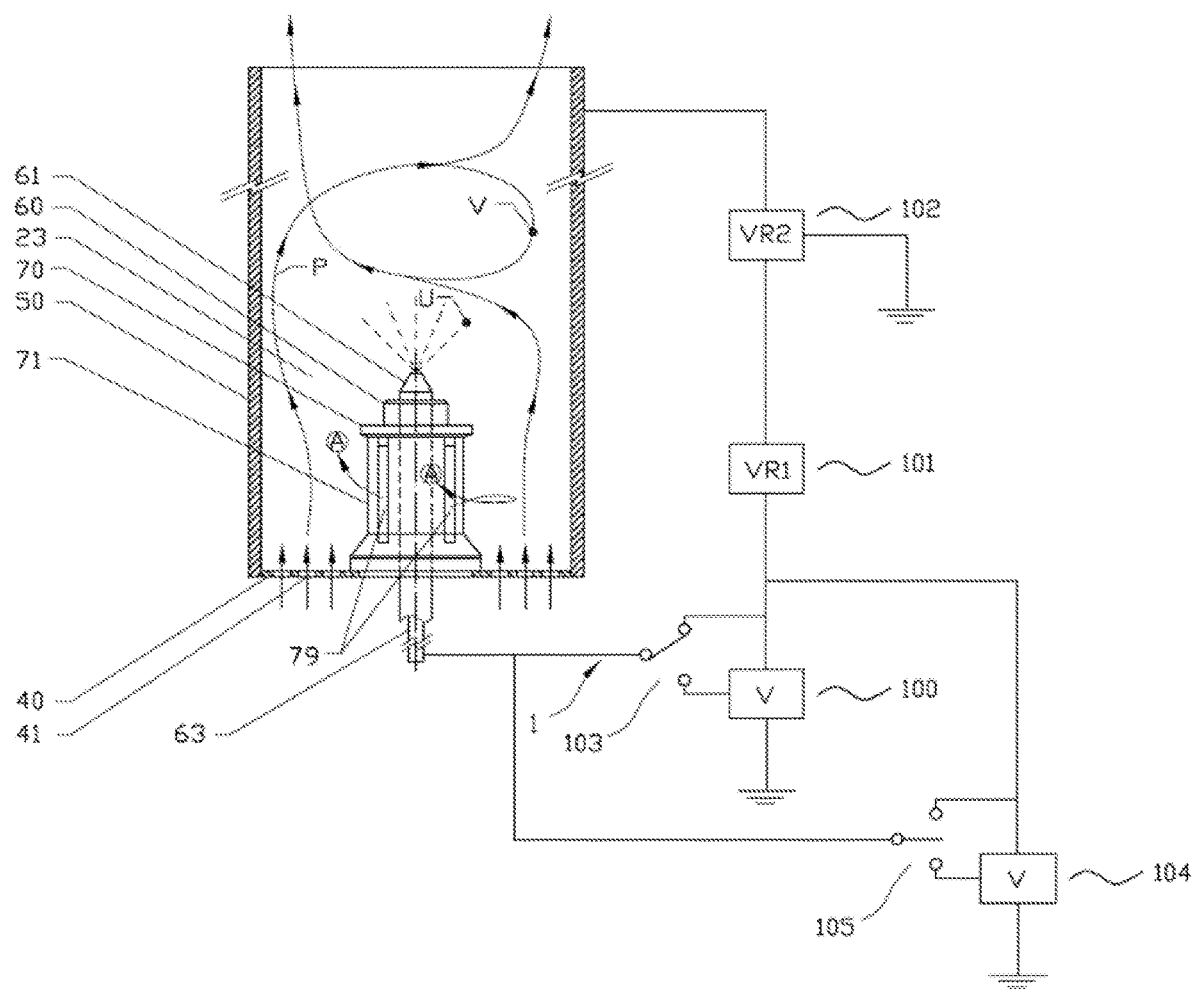
FIG. 9 is an axial sectional side view of the simplified modification of the fluidized bed apparatus according to the third embodiment of the present invention depicted in FIG. 7, wherein the circuit setting of the electrospray device and the convection path of the product are illustrated.

FIG. 9 shows a simplified modification of the fluidized bed apparatus 10 of the third embodiment of the present invention shown in FIG. 7, wherein the surrounding downward flow bed area 24 was removed from the fluidized bed apparatus 10. The spray-drying process of the solution shown in FIG. 9 is similar to that shown in FIG. 7, and the difference lies in that the spray-dried charged particles V travel in a rotational upward motion along the inner wall of partition 50, until the spray-dried charged particles V are guided and enter the electrostatic trapping device (not shown).

It should also be considered to be adapted to the requirements to SAS or RESS Technology by means of the modifications on pressure resistance and heat insulation of the liquid supply system and the spray system of the fluidized bed apparatus 10 according to the third embodiment of the present invention (not shown), the innovated fluidized bed apparatus 10 according to the present invention can be used for spray-drying the supercritical fluid solution, in order to produce ultrafine particles, especially liposomes. Preferably, the electrospray device 1 of the fluidized bed apparatus 10 used for spray-drying the supercritical fluid solution can be appended with the magnetic field generator 11, in order to improve the performance of the fluidized bed apparatus 10 to guide and collect the ultrafine particles, wherein the process is similar to which of shown in FIG. 8 for the spray-drying process of the solution, the consequent charged particles V are extremely tiny, which is in size from about one nanometer to one hundred nanometers.

Figure 8:
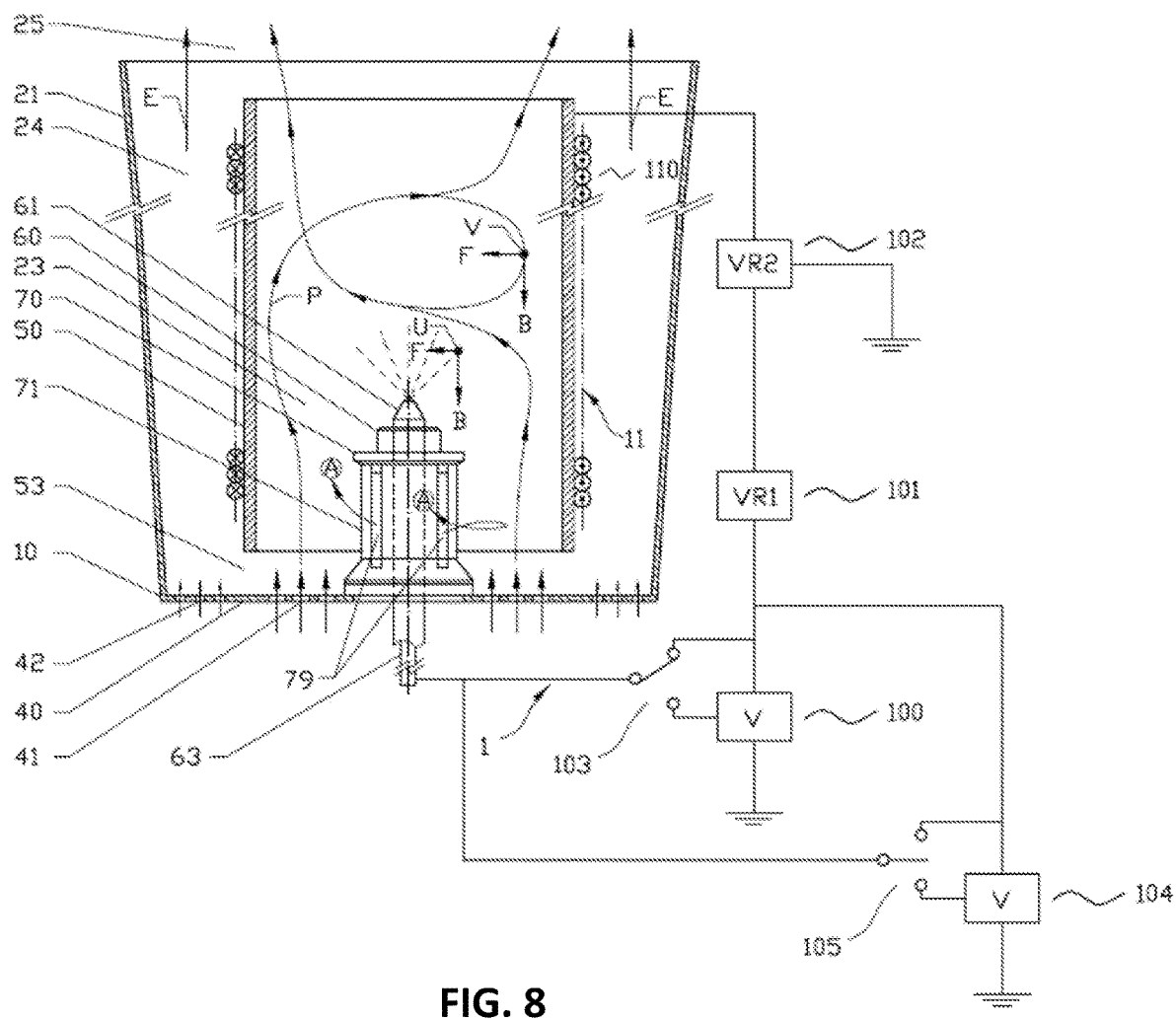
FIG. 8 is an axial sectional side view of the fluidized bed apparatus with the magnetic field generator appended according to the third embodiment of the present invention, wherein the circuit setting of the electrospray device, the structure of the magnetic field generator and the convection path of the product are illustrated.

The electrospray device 1 of the fluidized bed apparatus 10 shown in FIG. 7, FIG. 8 and FIG. 9 provides an electromagnetic hydrodynamic means of electrospray, in one aspect, which contributes to produce ultrafine particles in smaller particle size and more concentrated particle size distribution, and in another aspect, which benefits guiding and collecting the charged particles V.

The electrospray conditions implemented in the embodiments of the present invention can be properly controlled, for reference, these electrospray conditions may include:

Inner circular diameter of the partition: from 5 cm to 200 cm, preferably from 10 cm to 100 cm, most preferably 15 cm to 50 cm;

Voltage applied to the emissive electrode: from 500 volts to 50,000 volts, preferably from 2,000 volts to 20,000 volts, most preferably from 5,000 volts to 15,000 volts;

Voltage applied to the electrode voltage: from 100 volts to 10,000 volts, preferably from 200 volts to 5,000 volts, most preferably from 500 volts to 2,000 volts;

Electrical conductivity of the solution: from 60 μΩ-1/cm to 80,000 μΩ-1/cm;

Spray rate of the nozzle: from 50 ml/min to 5,000 ml/min, preferably from 100 ml/min to 2,000 ml/min, most preferably from 200 ml/min to 1,000 ml/min.

Relative to the prior arts, it is obvious that the advantages of the electrospray device 1 used in the fluidized bed apparatus 10 and the fluidized bed apparatus 10 comprising the electrospray device 1 according to the present invention are fully demonstrated by the description of the embodiments of the present invention. With reference to FIG. 5 and FIG. 6, wherein the electrospray device 1 of the fluidized bed apparatus 10 according to the present invention is used for the coating process of the particles. In one aspect, which benefits the sufficient Coulombic fission of the charged droplets Q ejected from the nozzle 61, and the atomization effect of spray is optimized, thus the fluidized bed apparatus 10 according to the present invention is adapted to coating the particles R in smaller particle size, the quality of the coating film is improved, and the performance of the fluidized bed apparatus 10 according to the present invention is upgraded. In another aspect, which benefits the sufficient developments of the spray pattern and the particle flow pattern by means of the interactive electromagnetic forces among the charged droplets Q, the charged particles S and the charged partition 50, the convection path of the product is optimized, the mutual adhesion among the charged particles S and "the wall-sticking effect" of the charged droplets Q are reduced or eliminated, such that the qualities of the process and the product are improved. In another aspect, wherein, after ejected from the nozzle 61, the charged droplets Q move along a rotational upward path similar to the Spiral of Archimedes under the joint effect of the electromagnetic field and the swirling upward air stream, the motion behaviors of the charged droplets Q and the charged particles S can be modified by altering the electromagnetic field and the swirling upward air stream, therefore, the electromagnetic hydrodynamic characteristics are given with accurate controllability. Therefore, the adaptability and optimization of the fluidized bed apparatus 10 to specific process requirements are improved.

Accordingly, with reference to FIG. 7, FIG. 8 and FIG. 9, the electrospray device 1 of the fluidized bed apparatus 10 according to the present invention is used for the spray-drying process of the solution. In one aspect, which benefits the sufficient Coulombic fission of the charged droplets U ejected from the nozzle 61 in order to optimize the atomization effect of spray, the fluidized bed apparatus 10 according to the present invention is adapted to producing the charged particles V in smaller particle size and more concentrated particle size distribution, and the performance of the fluidized bed apparatus 10 according to the present invention is upgraded. In another aspect, which benefits the sufficient development of the spray pattern by means of the interactive electromagnetic force among the charged droplets U, the charged particles V and the charged partition 50, the adhesion among the charged droplets U and/or the charged particles V mutually and "the wall-sticking effect" of the charged droplets U are reduced or eliminated, and the qualities of the process and the product are improved. In another aspect, wherein the consequent charged droplets U and the dried charged particles V move along a rotational upward path similar to the Spiral of Archimedes under the joint effect of the electromagnetic field and the swirling upward air stream, the motion behaviors of the charged droplets U and the charged particles V can be modified by altering the electromagnetic field and the swirling upward air stream, therefore, the electromagnetic hydrodynamic characteristics is given with accurate controllability, the adaptability and optimization of the fluidized bed apparatus 10 to specific process requirements are improved.

Moreover, the electrospray device 1 of the fluidized bed apparatus 10 according to the present invention can be easily and simply appended to the fluidized bed apparatus 10, so as to obtain functional innovation and performance upgrading, which saves lots of social resources and improves the values of application and popularization of the present invention.

It should be concerned that, in the embodiments of the present invention, although the magnetic field generator 11 is only an additional part of the electrospray device 1, which plays a part in synergizing and facilitating to the function of the electrospray device 1, when the fluidized bed apparatus 10 treats ultrafine particles, the ultrafine charged particles will be significantly disturbed by the external electromagnetic fields, in particular, the natural electromagnetic fields such as the earth's magnetic field and the solar magnetic storms, etc., whereby, the magnetic field generated by the magnetic field generator 11 is also enabled to eliminate or counter the interferences from the external electromagnetic fields.

It should also be concerned that, compared with the conventional fluidized bed apparatus, based on the electromagnetic hydrodynamic means of electrospray, the performance of the fluidized bed apparatus 10 of the present invention is fundamentally upgraded, which improves the process substantially. Therefore, the operational parameters of the fluidized bed apparatus 10 of the invention should be modified accordingly, so as to be adapt to the requirements to products and processes. For example, the conventional fluidized bed apparatus with bottom spray device produces droplets in size approximately from dozens of microns to a few hundred microns for coating particles in size approximately from one hundred microns to one thousand microns, as well as the fluidized bed apparatus 10 of the second embodiment according to the present invention produces the charged droplets Q in size approximately from one micron to dozens of microns for coating the charged particles R in size approximately from ten microns to one hundred microns. For another example, the conventional fluidized bed apparatus with top spray device produces spray-dried particles in size approximately from a few microns to one hundred microns, as well as the fluidized bed apparatus 10 of the third embodiment according to the present invention produces the spray-dried charged droplets Q in size approximately from a few nanometers to a few hundred nanometers. Therefore, in the second embodiment and the third embodiment of the present invention, compared with the conventional fluidized bed apparatus, the particle size of the product to be coated or to be spray-dried in the fluidized bed apparatus 10 decreases exponentially while as the specific surfaces of the product increases exponentially, such that the efficiency of solvent evaporation can be improved exponentially in the fluidized bed apparatus 10 of the present invention, wherein the requirements to basic operational parameters such as temperature, humidity and air volume can be reduced appropriately, and the quality of the coating film is improved as well. Therefore, the fluidized bed apparatus 10 of the present invention improves the quality of the product and reduces the requirements to operational parameters.

Particularly, it should be concerned that, by means of the modifications on pressure resistance and heat insulation of the liquid supply system and the spray system of the fluidized bed apparatus 10 according to the third embodiment of the present invention, the innovated fluidized bed apparatus 10 can be used to produce ultrafine particles such as liposomes from the spray-drying process of the supercritical fluid solution, it shows great advantages relative to the traditional liposome preparation process in liquid phase. In one aspect, the troubles on the solvent selection, solvent residue and the impairments of the solvent to the active component are removed, which relate to the traditional liposome preparation process in the liquid phase with a variety of solvents to dissolve the core materials, membrane materials and protective layer materials of liposome respectively. In another aspect, the consequent liposomes are produced in a more concentrated particle size distribution and a more uniform film-forming thickness under effect of the Coulombic fission. In another aspect, the impairments of the high shear force generated from the stirring process and the needle ice crystals formed in the freeze-drying process to the lipid bilayer membranes from the traditional liposome preparation process in liquid phase are overcome. In a further aspect, the product quality troubles on the mutual adhesion/fusion among liposomes from the traditional liposome preparation process in liquid phase and the shape defect of pancake-like due to shrinking of the lipid bilayer membranes after the solvent evaporated are overcome. In another further aspect, the troubles on scaling-up and industrializing from the traditional liposome preparation process in liquid phase are overcome. In another further aspect, which is convenient to split the liposome preparation process into several technological steps, such as steps on preparation of the liposome cores, coatings of the lipid bilayer membranes and the protective layers, etc., so that it is adapted to producing liposomes with a more complicated structure, more diversified functions, higher requirements to technological conditions and product quality. The above advantages on the liposome preparation process of the innovated fluidized bed apparatus 10 according to the third embodiment of the present invention are especially adapted to the liposome preparations of biomaterials and genetic materials, the scope of application of liposome has been greatly expanded.

In the electrospray device 1 of the fluidized bed apparatus 10 according to the present invention, the polarities and voltage values of the voltage applied to the nozzle 61 and the partition 50 can be easily controlled and monitored. Similarly, in the magnetic field generator 11 used in the electrospray device 1 of the fluidized bed apparatus 10 according to the present invention, the direction and intensity of the current I on the coil 110 can be easily controlled and monitored. Especially in the fluidized bed apparatus 10 for the spray-drying process of the solution, the particle size and particle size distribution of the spray-dried product can be controlled by adjusting the configurational parameters and operational parameters of the electrospray device 1 of the fluidized bed apparatus 10 according to the present invention, the product is given with more excellent granular characteristics, wherein the adjustable configurational parameters of the electrospray device 1 include for example, the genre and type of the nozzle 61, the diameter and height of the partition 50, the adjustable operational parameters of the electrospray device 1 include for example, the polarities and voltage values of the voltage applied to the nozzle 61 and the partition 50 respectively by the power supply 100, and the electric potential difference between the charged nozzle 61 and the charged partition 50. Similarly, the motion behavior of the spray-dried product can be controlled by adjusting the configurational parameters and operational parameters of the electrospray device 1 of the fluidized bed apparatus 10 according to the present invention, which benefits guiding and collecting the product, wherein the adjustable configurational parameters of the magnetic field generator 11 include for example, the ratio H/D namely the axial height H of the coil 110 to the diameter D of the partition 50, the turn number of the coil 110 and the layers of the coil 110 twined around the circumference of the partition 50. The adjustable operational parameters of the magnetic field generator 11 include for example, the direction and intensity of the current I loaded on the coil 110.

Due to the advantages of the fluidized bed apparatus 10 according to the present invention, the fluidized bed apparatus 10 can be fully adapted to the existing processes, such as coating particles, spray-drying solution. Furthermore, the methods according to the present invention can be fully applied to all materials, such as micro particles, fine powder, fine particles, granules, beads, pellets, pills, capsules and mini-tablets. Especially, the methods according to the present invention can also be used for ultrafine particles, such as microspheres, microcapsules, nanoparticles, composite particles and liposomes.

Furthermore, the methods according to the present invention can be performed as a step in a combined process, wherein preferably using the electrospray device 1 of the fluidized bed apparatus 10 according to the present invention.

The embodiments described above may have various modifications. For example, the electrospray device 1 can be configured with different combinations according to specific application requirements. The number of nozzles 61 as emitter electrodes can be multiple and the nozzles 61 can be assembled in a non-coaxial manner with the partition 50. The partition 50 as the opposed electrode can be segmented along the axial direction by means of the electrical insulation, and a gradient voltage and/or a gradient current are applied segmentally to form a gradient electric field and/or a gradient magnetic field. In addition, the number of the opposed electrodes can be two or even more, wherein at least one opposed electrode can be integrated with the sprayer 60, so that the sprayer 60 itself can be turned into an independent electrospray device and is applied in combination with the charged partition 50.

The embodiments described above can also be applied independently or combined with each individual invention element conceived in the present invention to form new embodiments. For example, the second embodiment can be varied by applying a high voltage only to the nozzle 61 through the solution line 63 and without applying a voltage to the partition 50 from the power supply 100, in case of coating the particles R in large particle size, "the wall-sticking effect" is eliminated or reduced which may arise out of the spray while as the particle flow cannot fully cover the inner wall of the partition 50. Moreover, e.g., the third embodiment can be varied by alternating the direction of the current I to alternate the direction of the magnetic field B consequently, in order to generate the centrifugal Lorentz force applied to the charged droplets U and the charged particles V respectively. For the spray-drying the viscous solution, the centrifugal Lorentz force can preferably cooperates with the electric field force and the Coulombic force to benefit a sufficient development of the spray pattern, thus, the emphasis of the magnetic field generator 11 on the process improvements is transformed from preventing from "the wall-sticking effect" into benefitting the sufficient development of the spray pattern, and "the wall-sticking effect" of the spray can be reduced or eliminated by increasing the Coulombic force which makes the charged partition repels the charged droplets. The fluid bed apparatus 10 of the present invention may be preferably adapt to the characteristics of different products and different process requirements in any of the new embodiments composited from the above-mentioned independent application or combined application.

Figure 10:
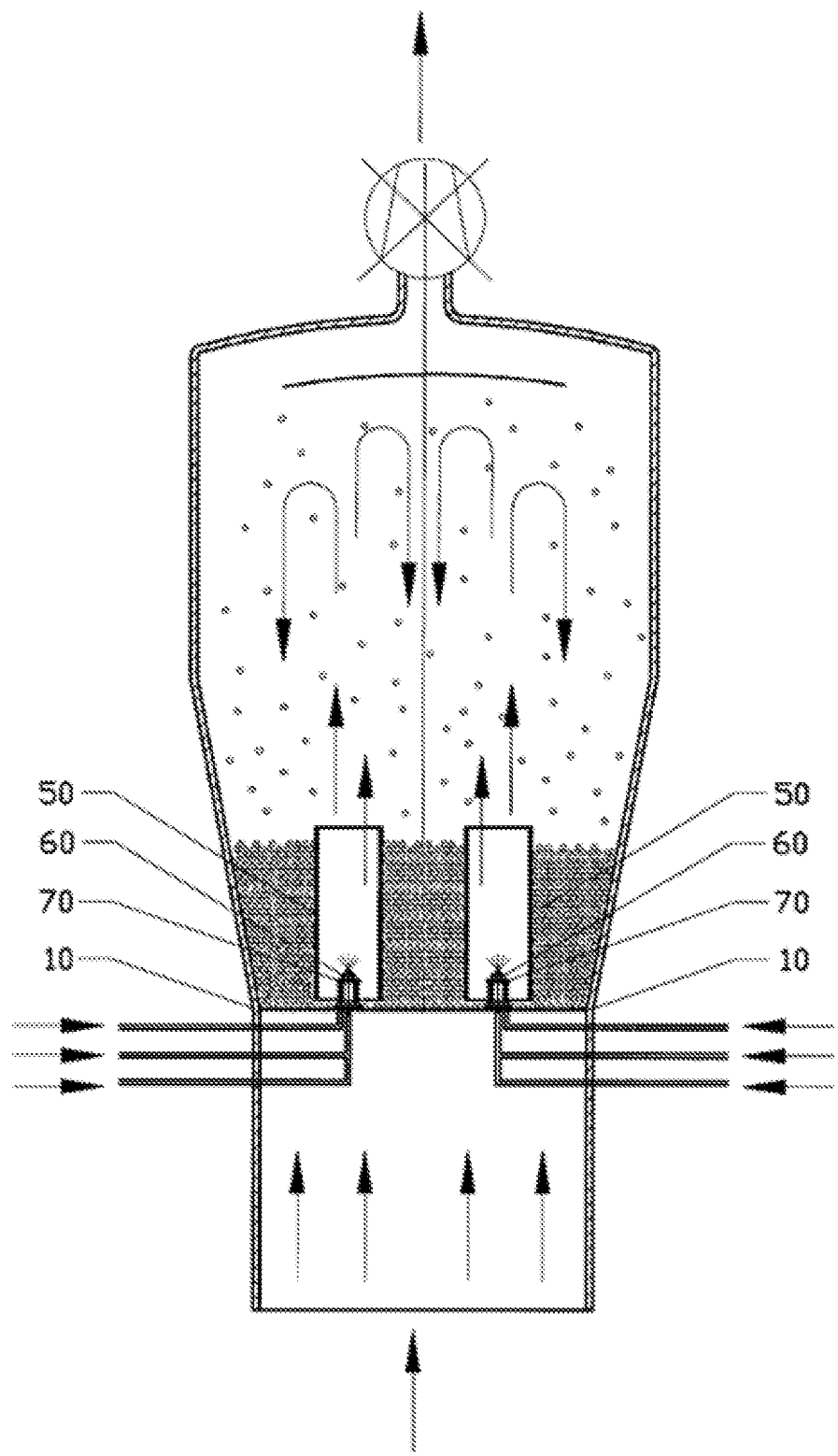
FIG. 10 is an axial sectional side view of the modification according to the second embodiment of the present invention, wherein the fluidized bed apparatus comprises a plurality of nozzles and partitions, but the circuit setting of the electrospray device is not illustrated.
Figure 11:
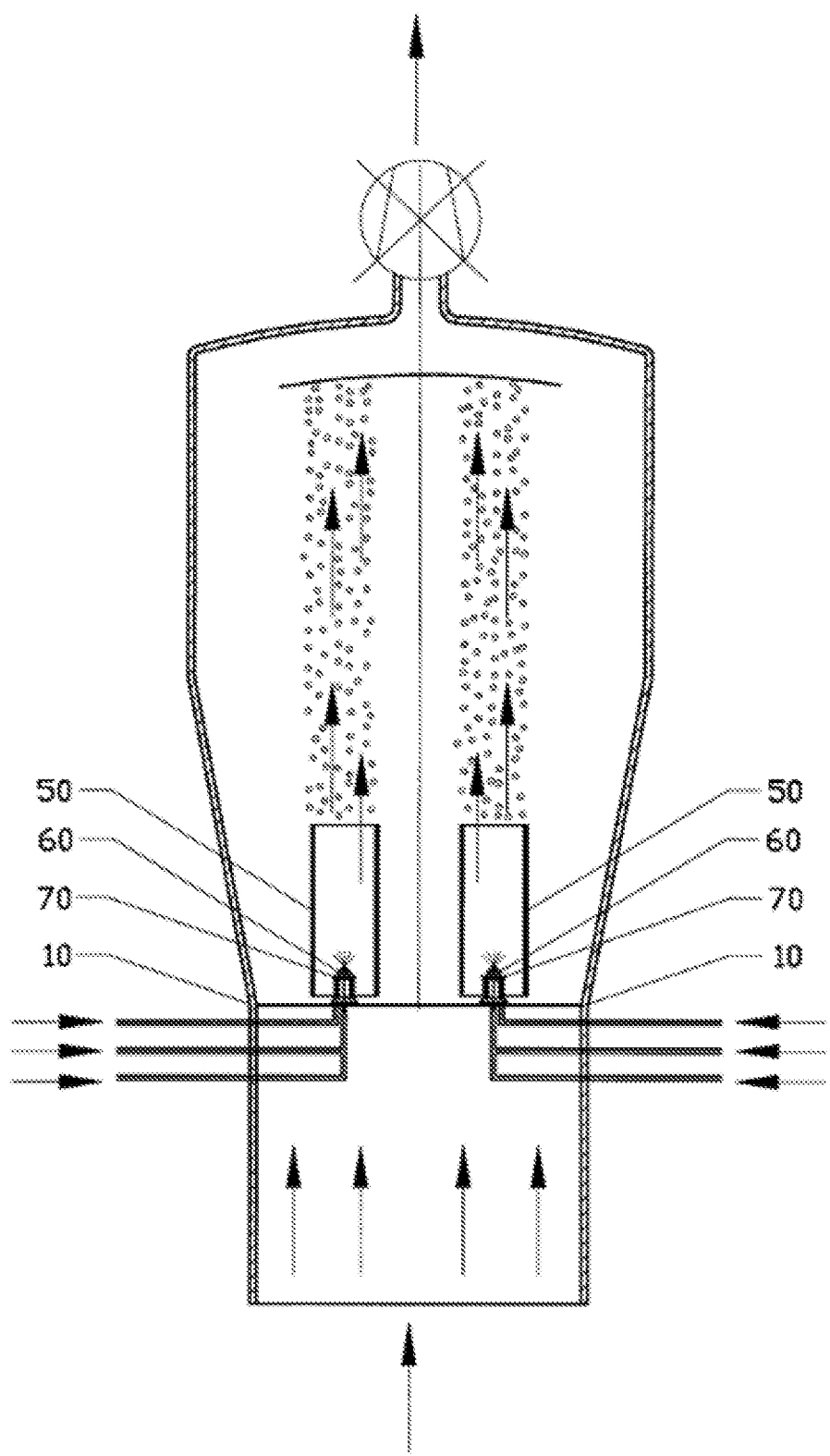
FIG. 11 is an axial sectional side view of the modification according to the third embodiment of the present invention, wherein the fluidized bed apparatus comprises a plurality of nozzles and partitions, but the circuit setting of the electrospray device is not illustrated.
Figure 12:
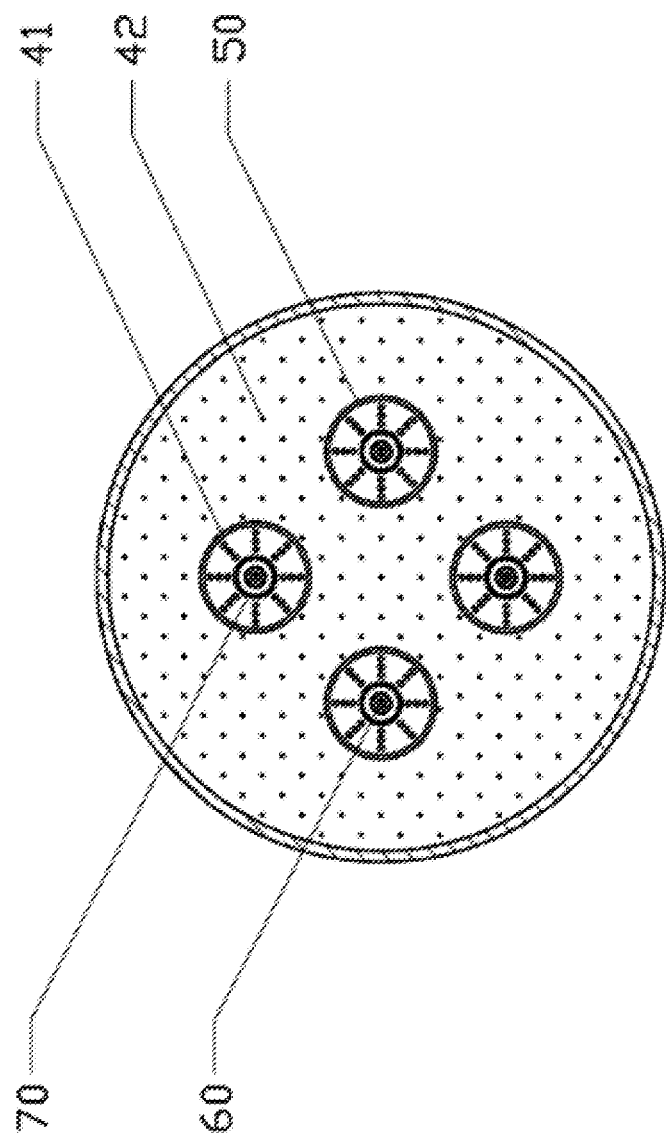
FIG. 12 is a horizontal sectional top view of the fluidized bed apparatus according to the embodiments depicted in FIG. 10 and FIG. 11, wherein the circuit setting of the electrospray device is not illustrated.

In the modification of the second embodiment comprising several processing modules as shown in FIG. 10 and FIG. 12, said modules are placed on a generally circular air distribution plate 40 in the same or similar configuration and construction. The particles R circulate in substantially identical pattern in each processing module, so that the particles R spend substantially the same time when passing through the spray zone and obtain a uniform processing with high quality, which increases the spray rates and expedites the operation, thus, the risk of adhesions of the particles and clogging of the nozzle 61 is eliminated or reduced, and the risk of varying flow resistance caused by agglomerations of the particles are also removed. Furthermore, the attrition among the particles is decreased due to the fact that the particle flow pattern of the particles in the partition 50 travel spirally upwards. Similarly, the modification of the third embodiment as shown in FIG. 11 and FIG. 12 may also comprise several processing modules, and said modules are placed on a generally circular air distribution plate 40 in the same or similar configuration and construction. The solution to be sprayed is spray-dried in substantial identical patterns in each processing module. Due to the high charge density of the charged particles V from spray-drying, the charged particles V are adapted to be guided and enter the electrostatic trapping device for efficient collection, the technological troubles from the charged particles V due to the aggregation and adhesion caused by high surface energy are reduced or eliminated, and the production efficiency is improved.

Although the embodiments of the present invention provide some reference data for implementing the present invention, these reference data are only for the convenience of implementing the embodiments of the present invention. There are no constraints and restrictions on the claims of the present invention, and the scope of these reference data within a wide range of expectations in conformity with the claims of the present invention can be modified properly.

Although the embodiments of the present invention do not describe in detail the polarities of the voltage applied to each charged element and the electrical insulation measures taken between the various charged elements of the electrospray device 1 of the fluid bed apparatus 10 according to the present invention. It is obvious, however, the facts that the polarities of the voltage applied to the above-mentioned charged elements are replaceable and these electrical insulation measures are obvious to the technical personnel in this field, are therefore included in the broad scope of the claims of the present invention.

On the premise of conforming to the aerodynamic and electromagnetic hydrodynamic characteristics of the partition 50 in the present invention, the shape of the partition 50 in the present invention may be a rotational-symmetrical cylinder or an approximate cylinder, such as a rotational-symmetrical Venturi-like form or a partial Venturi-like form. In addition, the materials of the partition 50 of the present invention can be either all metal or partial metal, so as to adapt to the requirements to the electrospray device 1.

Whereas the present invention has been shown and described in connection with the preferred embodiments thereof, it is obvious that any modifications, substitutions, and additions may be made within the intended broad scope as claimed in the claims.

What is claimed is:

1. An electrospray device for a fluidized bed apparatus, the electrospray device comprising:
a sprayer including a sprayer body and a nozzle provided at a top of the sprayer, characterized in that the sprayer body is provided with a swirl generator for generating a swirling air stream; a partition positioned vertically and coaxially with the sprayer; and a power supply directly or indirectly connected between the nozzle and the partition, so as to apply voltage to the nozzle and the partition, wherein the voltage to the nozzle and the voltage to the partition applied by the power supply are in opposite polarities or a same polarity, and charged droplets pass through a spray zone of the sprayer;

wherein the power supply applies a higher voltage to the nozzle than the voltage applied to the partition, and wherein electrospray device has a primary rheostat arranged between the power supply and the partition, so as to decrease the voltage applied by the power supply.

2. The electrospray device according to claim 1, wherein electrospray device further comprises a secondary rheostat connected between the primary rheostat and the partition with grounding, so as to further decrease the voltage already decreased by the primary rheostat.

3. The electrospray device according to claim 2, wherein an electric potential difference between the nozzle and the partition can be modified by adjusting the primary rheostat and the secondary rheostat.

4. The electrospray device according to claim 3, wherein a transfer switch is provided among the power supply, the nozzle and the primary rheostat, so as to alternate the polarities of voltage applied by the power supply to the nozzle and the partition, respectively.

5. The electrospray device according to claim 3, wherein the primary rheostat and/or the secondary rheostat are replaced by fixed resistors.

6. An electrospray device for a fluidized bed apparatus, the electrospray device comprising:

a sprayer including a sprayer body and a nozzle provided at a top of the sprayer, characterized in that the sprayer body is provided with a swirl generator for generating a swirling air stream;

a partition positioned vertically and coaxially with the sprayer; and a power supply directly or indirectly connected between the nozzle and the partition, so as to apply voltage to the nozzle and the partition, wherein the voltage to the nozzle and the voltage to the partition applied by the power supply are in opposite polarities or a same polarity, and charged droplets pass through a spray zone of the sprayer, and wherein the power supply comprises two power supplies respectively connected to the nozzle and the partition, and the partition comprises a magnetic field generator.

7. The electrospray device according to claim 6, wherein the magnetic field generator is a coil which is spirally twined around a circumference of the partition.

8. A fluidized bed apparatus for coating particles, the fluidized bed apparatus comprising:

a product container;

a lower plenum base; and an air distribution plate resided between the product container and the lower plenum base, wherein fluidized bed apparatus has at least one electrospray device described according to claim 1, and wherein the polarities of voltage applied by the power supply to the nozzle and the partition are opposite.

9. A fluidized bed apparatus for spray-drying a solution, the fluidized bed apparatus comprising:

a product container;

a lower plenum base; and an air distribution plate resided between the product container and the lower plenum base, wherein the fluidized bed apparatus has at least one electrospray device described according to claim 1, and wherein the polarities of voltage applied by the power supply to the nozzle and the partition are the same.

10. The fluidized bed apparatus for spray-drying the solution according to claim 9, wherein the solution is a supercritical fluid solution.

11. The fluidized bed apparatus according to claim 9 for spray-drying the solution, further comprising an electrostatic trapping device provided to collect a spray-dried product.

12. A method for coating particles in a fluidized bed apparatus according to claim 8, the method comprising:

providing particles to be coated;

providing a solution to be sprayed for coating the particles to the nozzle of the sprayer by means of a solution pipeline;

providing the swirling air stream in an upwards direction relative to the sprayer along a circumference outwards, so that said particles to be coated rotate upwards in the partition;

applying the voltage applied by the power supply to the nozzle and the partition, so that the solution ejected from the nozzle includes charged droplets.

13. The method according to claim 12, wherein the swirling air stream directs the particles to be coated to enter a rotational upward path along an inner wall of the partition, wherein the particles to be coated are charged to be turned into charged particles due to contacting with the inner wall of the partition, and the charged particles enter a spray zone along with the swirling air stream.

14. The method according to claim 13, wherein the charged droplets ejected from the nozzle move in a rotational upward motion and enter the spray zone in the partition under a joint effect of an electric field created between the nozzle and the partition, and the swirling air stream in the partition.

15. The method according to claim 14, further comprising:

performing an electrospray step, wherein a voltage applied to the nozzle is higher than a voltage applied to the partition, so that the charged particles and the charged droplets in the spray zone attract each other first due to the opposite charge polarities therebetween, wherein the charged droplets deposit on surfaces of the charged particles and are combined with the charged particles;

wherein as the charged particles are further combined with the charged droplets in the spray zone, a net charge of the charged particles is gradually decreased, the deposition of charged droplets on the charged particles is gradually decreased, and the deposition of the charged droplets on the charged particles is finally stopped when the net charge of the charged particles comes down to zero;

wherein the charged particles approach to and contact with the inner wall of the partition in the rotational upward path under a centrifugal force so as to be recharged.

16. The method according to claim 15, wherein the electrospray step is repeated until the charged particles are turned into coated particles and leave the spray zone in the rotational upward path.

17. The method according to claim 16, wherein:

when the coated particles travel into an expansion area above the partition through the spray zone along the rotational upward path, the coated particles encounter a low-velocity air stream, which causes the coated particles to fall downwards in a downward flow bed area; and wherein in the downward path the coated particles are dried to such an extent that a weaker upward air stream through a surrounding area of the air distribution plate is sufficient to avoid agglomeration in a fluidized layer, and the coated particles are dried sufficiently in the fluidized layer and then reenter a next cycle of the method.

18. The method according to claim 16, further comprising repeating the method until the coated particles reach a preset extent of the coating.

19. The method according to claim 16, wherein a magnetic field effect is applied to the charged droplets and the charged particles in a rotational upward motion in the partition by a magnetic field generator.

20. The method according to claim 19, wherein the magnetic field is an axial magnetic field relative to the swirling air stream.

21. A method for spray-drying a solution in a fluidized bed apparatus according to claim 9, the method comprising:
providing a solution to be spray-dried to the nozzle of the sprayer by means of a solution pipeline;
providing the swirling air stream in an upwards direction relative to the sprayer along a circumference outwards, wherein the swirling air stream is used for spray-drying the solution; and
applying the voltage applied by the power supply to the nozzle and the partition, so that the solution ejected from the nozzle includes charged droplets.

22. The method according to claim 21, wherein the charged droplets ejected from the nozzle move in a rotational upward motion in the partition under a joint effect of an electric field created between the nozzle and the partition, and the swirling air stream in the partition, until the charged droplets are turned into spray-dried charged particles after preliminary drying.

23. The method according to claim 22, wherein a voltage applied to the nozzle is higher than a voltage applied to the partition in the same polarity, so that the charged droplets and/or the charged particles are repulsive mutually first due to the same polarity of charge.

24. The method according to claim 21, further comprising using an electrostatic trapping device to collect a spray-dried product.

25. The method according to claim 21, wherein the solution is a supercritical fluid solution.

26. The method according to claim 22, further comprising applying, by a magnetic field generator, a magnetic field effect to the charged droplets and the charged particles in a rotational upward motion in the partition.

27. The method according to claim 26, wherein the magnetic field is an axial magnetic field relative to the swirling air stream.

28. The method according to claim 21, wherein a particle size and a particle size distribution of the spray-dried product is controlled by adjusting configurational parameters and/or operational parameters of the electrospray device of the fluidized bed apparatus.

29. The method according to claim 21, wherein a motion behavior of the spray-dried product is controlled by adjusting configurational parameters and/or operational parameters of a magnetic field generator of the fluidized bed apparatus.

* * * * *